(12) United States Patent
Wiebe et al.

(10) Patent No.: US 11,157,828 B2
(45) Date of Patent: Oct. 26, 2021

(54) TOMOGRAPHY AND GENERATIVE DATA MODELING VIA QUANTUM BOLTZMANN TRAINING

(71) Applicant: Microsoft Technology Licensing, LLC, Redmond, WA (US)

(72) Inventors: Nathan O. Wiebe, Redmond, WA (US); Maria Kieferova, Waterloo (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 1137 days.

(21) Appl. No.: 15/625,712

(22) Filed: Jun. 16, 2017

(65) Prior Publication Data

US 2018/0165601 A1 Jun. 14, 2018

Related U.S. Application Data

(60) Provisional application No. 62/431,437, filed on Dec. 8, 2016.

(51) Int. Cl.
*G06F 15/18* (2006.01)
*G06N 20/00* (2019.01)
(Continued)

(52) U.S. Cl.
CPC .............. *G06N 20/00* (2019.01); *G06F 7/523* (2013.01); *G06F 17/11* (2013.01); *G06N 3/0445* (2013.01); *G06N 3/06* (2013.01); *G06N 10/00* (2019.01)

(58) Field of Classification Search
CPC ...................................................... G06F 17/11
See application file for complete search history.

(56) References Cited

U.S. PATENT DOCUMENTS

2014/0358745 A1* 12/2014 Lunan .................... G06Q 40/12
705/30
2015/0112182 A1* 4/2015 Sharma ................ A61B 5/7264
600/408
(Continued)

FOREIGN PATENT DOCUMENTS

WO WO 2016/011440 1/2016

OTHER PUBLICATIONS

'Positive-operator-valued measures in the Hamiltonian formulation of quantum mechanics' Arsenovic, 2015, Physical review., 062114-1 to 062114-9.*

(Continued)

*Primary Examiner* — Kakali Chaki
*Assistant Examiner* — Peter D Coughlan
(74) *Attorney, Agent, or Firm* — Klarquist Sparkman, LLP

(57) ABSTRACT

Quantum neural nets, which utilize quantum effects to model complex data sets, represent a major focus of quantum machine learning and quantum computing in general. In this application, example methods of training a quantum Boltzmann machine are described. Also, examples for using quantum Boltzmann machines to enable a form of quantum state tomography that provides both a description and a generative model for the input quantum state are described. Classical Boltzmann machines are incapable of this. Finally, small non-stoquastic quantum Boltzmann machines are compared to traditional Boltzmann machines for generative tasks, and evidence presented that quantum models outperform their classical counterparts for classical data sets.

13 Claims, 24 Drawing Sheets

(51) Int. Cl.
  *G06N 10/00* (2019.01)
  *G06N 3/04* (2006.01)
  *G06N 3/06* (2006.01)
  *G06F 7/523* (2006.01)
  *G06F 17/11* (2006.01)

(56) References Cited

U.S. PATENT DOCUMENTS

| | | | | |
|---|---|---|---|---|
| 2015/0317558 | A1* | 11/2015 | Adachi | G06N 3/06 706/19 |
| 2016/0110311 | A1* | 4/2016 | Tucci | G06N 10/00 712/42 |
| 2016/0163035 | A1* | 6/2016 | Chang | G06T 7/0004 382/149 |
| 2016/0174902 | A1* | 6/2016 | Georgescu | G06T 7/0012 600/408 |
| 2016/0199215 | A1* | 7/2016 | Kopelman | A61F 5/566 128/848 |
| 2016/0275374 | A1* | 9/2016 | Zhu | G06K 9/6267 |
| 2016/0275397 | A1* | 9/2016 | Neil | G06N 3/049 |
| 2016/0300134 | A1 | 10/2016 | Min et al. | |
| 2016/0328659 | A1* | 11/2016 | Mohseni | G06F 15/82 |
| 2018/0365587 | A1* | 12/2018 | Barzegar | G01R 33/0356 |

OTHER PUBLICATIONS

'Quantum Inspired Training for Boltzmann Machines': Wiebe, arxiv, 2015.*
'Tight Bound on Relative Entropy by Entropy Difference' Reeb, 2015, IEEE0018-9448.*
Relaxation of the EM Algorithm via Quantum Annealing: Miyahara, 2016, American control conference.*
Amin et al., "Quantum Boltzmann Machine," 10 pp. (Jan. 2016).
Chowdhury et al., "Quantum algorithms for Gibbs sampling and hitting-time estimation," 13 pp. (Mar. 2016).
International Search Report and Written Opinion dated Mar. 21, 2018, from International Patent Application No. PCT/US2017/064394, 17 pp.
Kieferova et al., "Tomography and Generative Data Modeling via Quantum Boltzmann Traning," arXiv:1612.05204v1, pp. 1-13 (Dec. 2016).
Wiebe et al., "Quantum Deep Learning," arXiv:1412.3489v2, 34 pp. (May 2015).
Wiebe et al., "Quantum Inspired Training for Boltzmann Machines," arXiv:1507.02642v1, pp. 1-18 (Jul. 2015).
Yung et al., "A Quantum-Quantum Metropolis Algorithm," 7 pp. (Nov. 2010).
Communication Pursuant to Article 94(3) EPC (Office Action) issued in European Patent Application No. 17829755.2, dated May 20, 2021, 8 pages.

* cited by examiner

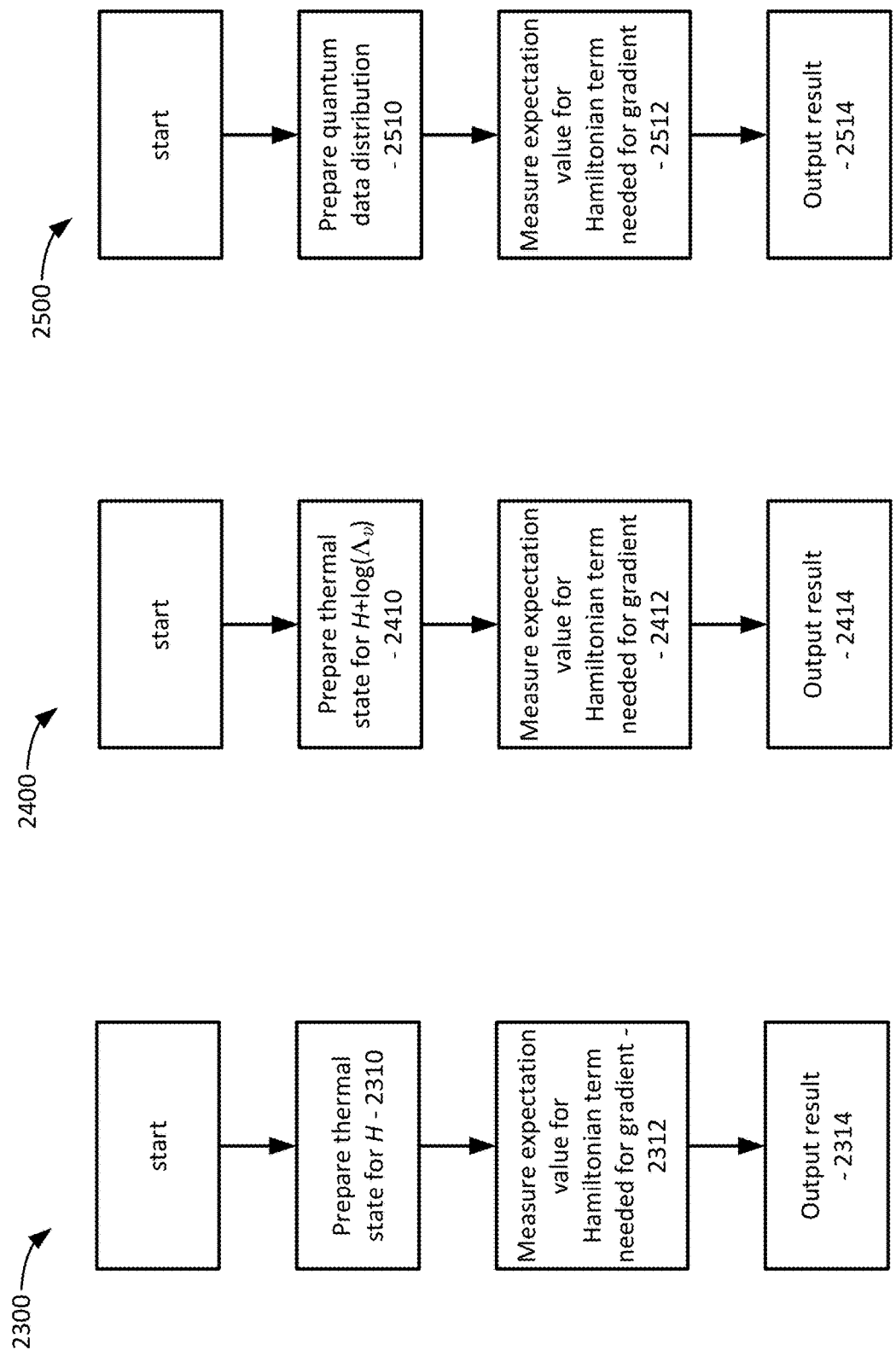

TOMOGRAPHY AND GENERATIVE DATA MODELING VIA QUANTUM BOLTZMANN TRAINING

CROSS REFERENCE TO RELATED APPLICATIONS

This application claims the benefit of U.S. Provisional Application No. 62/431,437 entitled "TOMOGRAPHY AND GENERATIVE DATA MODELING VIA QUANTUM BOLTZMANN TRAINING" and filed on Dec. 8, 2016, which is hereby incorporated herein by reference in its entirety.

FIELD

This application concerns quantum computing. In particular, this application concerns implementing Boltzmann machines in a quantum computing device.

SUMMARY

Quantum neural nets, which utilize quantum effects to model complex data sets, represent a major focus of quantum machine learning and quantum computing in general. In this application, example methods of training a quantum Boltzmann machine are described. Also, examples for using quantum Boltzmann machines to enable a form of quantum state tomography that provides both a description and a generative model for the input quantum state are described. Classical Boltzmann machines are incapable of this. Finally, small non-stoquastic quantum Boltzmann machines are compared to traditional Boltzmann machines for generative tasks, and evidence presented that quantum models outperform their classical counterparts for classical data sets.

In particular examples disclosed herein, both quantum and classical terms in the Hamiltonian are learned in a quantum computer implementing a quantum Boltzmann machine through either a POVM-based Golden-Thompson training approach or by training according to the relative entropy. Further, the latter approach enables a form of tomography, which (in concert with a quantum simulator) allows for Hamiltonian models to be learned for complex quantum states that cannot be probed using conventional tomographic approaches.

More specifically, methods, systems, and apparatus for: (a) the training of non-stoquastic quantum Boltzmann machines using quantum computers; (b) training quantum Boltzmann machines using measurement records that result from using measurement operators that do not just project onto the computational oasis; (c) training quantum Boltzmann machines using commutator expansions of the derivative of the average log-likelihood; (d) training Boltzmann machines based on the relative entropy between an input state and the state output by the Boltzmann machine; (e) using quantum Boltzmann machines to perform tomographic reconstructions of quantum or classical data; and/or (f) training quantum Boltzmann machines that are built upon Gibbs states for systems of fermions, such as electrons, are described herein. In particular implementations, examples of training quantum Boltzmann machines that are described by 2-local non-stoquastic Hamiltonians are described.

The disclosed technology is noteworthy for several reasons, including that it provides a new approach to machine learning that is not known to be classically simulatable. This means that new classes of learning that have no analogues in classical computing are enabled. The disclosed methods also are shown to outperform small classical Boltzmann machines. The disclosed methods also allow such machine learning algorithms to be generalized to quantum data.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

BRIEF DESCRIPTION OF THE DRAWINGS

FIGS. 23-25 are flowcharts illustrating exemplary methods for determining thermal averages.

DETAILED DESCRIPTION

I. General Considerations

Figure 1:
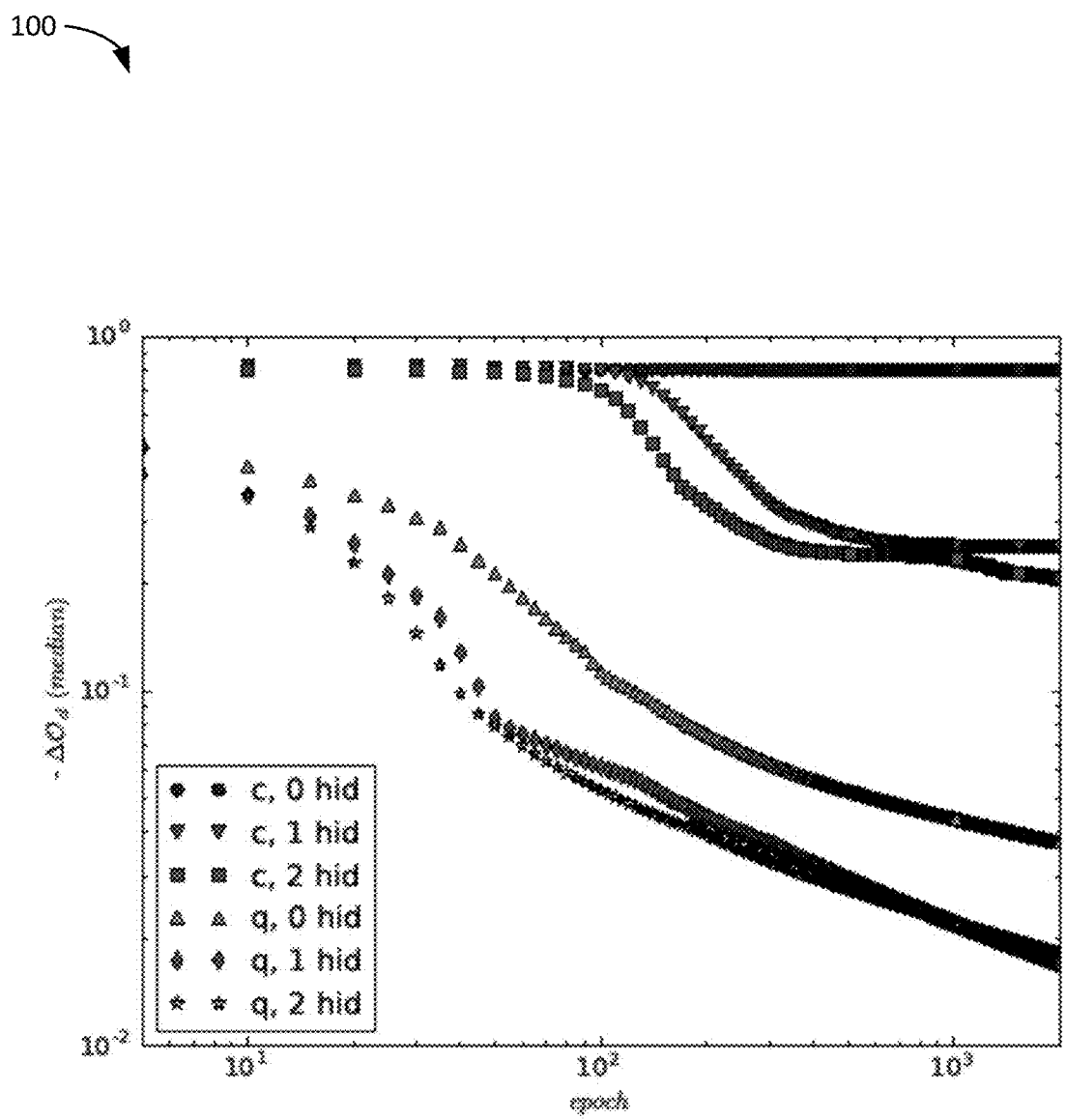
FIGS. 1-4 show simulation results of example Quantum Boltzmann machines with positive-operator valued measure ("POVM") training.

As used in this application, the singular forms a, an, and the include the plural forms unless the context clearly dictates otherwise. Additionally, the term includes means comprises. Further, as used herein, the term and/or means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like produce and provide to describe the disclosed methods. These terms are high-level abstractions of the actual operations that are performed. The actual operations that correspond to these terms will vary depending on the particular implementation and are readily discernible by one of ordinary skill in the art.

II. Introduction to the Disclosed Technology

The Boltzmann machine is a type of recurrent neural net that, unlike the feed forward neural nets used in many applications, is capable of generating new examples of the training data. See, e.g., Geoffrey E Hinton. Training products of experts by minimizing contrastive divergence, Neural computation, 14(8):1771-1800 (2002). This makes the Boltzmann machine an excellent model to use in cases where data is missing. Of all neural net models, the Boltzmann machine is perhaps the most natural one for physicists. It models the input data as if it came from an Ising model in thermal equilibrium. The goal of training is then to find the Ising model that is most likely to reproduce the input data, which is known as a "training set".

The close analogy between this model and physics has made it a natural fit for quantum computing and quantum annealing. One outstanding question in this regard is the question of whether transitioning from an Ising model to a quantum model for the data would provide substantial improvements.

This question was discussed, for example, in Mohammad H Amin et al., Quantum Boltzmann machine, arXiv preprint arXiv:1601.02036 (2016) (hereinafter "Amin et al."), which discussed a method for training Boltzmann machines that use transverse Ising models in thermal equilibrium to model the data. While such models were shown to be trainable and could outperform classical Boltzmann machines, their training procedure suffered two drawbacks. First, it was unable to learn quantum terms from classical data. Second, the transverse Ising models they considered are widely believed to be simulatable using quantum Monte-Carlo methods. This means that such models are arguably not quantum. In this disclosure, those issues are rectified. In particular, this disclosure describes new training methods that do not suffer these drawbacks. Additionally, it is shown that their performance is manifestly quantum.

When approaching the problem of training Boltzmann machines within a quantum setting, it is useful to define the model and the problem. In example embodiments of the disclosed approach, the quantum Boltzmann machine comprises two components. The first is a Hamiltonian model that is used to enforce energy penalties between different states as well as to allow quantum correlations between concepts. The second element is the training data.

Definition 1. Let V be a set of n vertices and E be a set of edges connecting these vertices. Then define $H \in \mathbb{C}^{2^n \times 2^n}$ to be a Hermitian matrix such that $H = H_{cl} - H_{qm}$, where $H_{cl}$ is the classical Boltzmann model $$H_{cl} = \sum_{j \in V} b_j \hat{n}_j + \sum_{k \in E} w_k \hat{n}_{k_1} \hat{n}_{k_2},$$

where $\hat{n}_j = (\mathbb{1} - \sigma_z^{(j)})/2$ and $H_{qm}$ is a matrix such that $\|H_{qm} - \text{diag}(H_{qm})\| > 0$.

A. Training Quantum Boltzmann Machines

Examining the quantum analogue of machine learning algorithms is very much like examining the quantum analogue of dynamical systems in that there are many ways that the classical Boltzmann machine can be translated to a quantum setting. Here, several example methods are disclosed, including: Positive operator value measure ("POVM") based training and state based training. The basic difference between the approaches stems from the correspondence used to generalize the notion of classical training data into a quantum setting.

POVM based training is a modification of the approach in Amin et al., which assumes that the user is provided with a discrete set of training vectors that are assumed to be sampled from an underlying training distribution. In Amin et al., the algorithm is trained using projectors on the classical training states. The goal of training is then to find the quantum Hamiltonian that maximizes the log-likelihood of generating the observed training vectors. In the POVM based training approach described herein, the training set is described as a set of measurements and is generalized to allow the measurement record to correspond to labels of POVM elements. In this approach, the training data can correspond to density operators as well as non-orthogonal states.

Definition 2. Let $\mathcal{H} := \mathcal{V} \otimes \mathcal{L}$ be a finite-dimension Hilbert space describing a quantum Boltzmann machine and let $\mathcal{V}$ and $\mathcal{L}$ be subsystems corresponding to the visible and latent units of the QBM. The probability distribution $P_v$ and POVM $\Lambda = \{\Lambda_v\}$, comprise a training set for QBM training if 1) there exists a bijection between the domain of $P_v$ and $\Lambda$ and 2) the domain of each $\Lambda_v$ is $\mathcal{H}$ and it acts non-trivially only on subsystem $\mathcal{V}$.

As a clarifying example, consider the following training set. Imagine that one wishes to train a model that generates even numbers. Then a sensible training set would be $$\Lambda_n = |2n\rangle\langle 2n| \text{ for } 1 \le n \le 8 \tag{1}$$

$$\Lambda_0 = \mathbb{1} - \sum_{n=1}^{8} \Lambda_n, \tag{2}$$

$$P_v = (1 - \delta_{v,0})/8. \tag{3}$$

The following equivalent training set can also be used $$\Lambda_1 = \frac{1}{8}(|2\rangle + \ldots + |16\rangle)(\langle 2| + \ldots + \langle 16|), \tag{4}$$

$$\Lambda_0 = \mathbb{1} - \Lambda_1 \tag{5}$$

$$P_v = \delta_{v,1}. \tag{6}$$

Both learning problems aim to mimic the same probability distributions. This shows that the training data for quantum Boltzmann training can be complex even when a single training vector is used.

The second approach assumes that the training data is provided directly through a quantum state that gives the true distribution over the data. This approach is typically stronger than POVM based training because measurements of the state can provide the statistics needed to perform the former form of training. It will be shown that this approach has the advantage that it can easily allow quantum Boltzmann machines to perform a type of tomographic reconstruction of the state and also can allow forms of training that make fewer approximations than existing methods. The former advantage is particularly significant as it creates a link between quantum state tomography and quantum machine learning. For this approach, the training set is defined as follows:

Definition 3. Let $\mathcal{H}$ be a finite-dimensional Hilbert space and let $\rho$ be a Hermitian operator on $\mathcal{H}$. The operator $\rho$ is a training set for state based training if it is a density operator.

As a clarifying example, the training data given in Eq. (1) could correspond to the following training data for state based learning $$\rho = \frac{1}{8}(|2\rangle\langle 2| + \ldots + |16\rangle\langle 16|) \tag{7}$$

In state-based training is assumed that copies of $\rho$ are prepared by an oracle and will not assume that the user has neither performed any experiments on $\rho$ nor has any prior knowledge about it. This is in contrast to POVM based training where the user has a set of measurement records but not the distribution it was drawn from.

B. Hamiltonian

The last part to specify is the Hamiltonian for a quantum Boltzmann machine. There are many Hamiltonians that one could consider. Perhaps the most natural extension to the Boltzmann machine is to consider the transverse Ising model, which was investigated by Amin et al. Here, a different example is considered, motivated by the fact that the stoquastic Hamiltonians used in Amin et al. can be efficiently simulated using quantum Monte-Carlo methods. In order to combat this, Hamiltonians that are Fermionic are used because the Fermionic sign problem prevents quantum Monte-Carlo methods front providing an efficient simulation.

Definition 4. Let V be a set of n vertices and E be a set of edges connecting these vertices. Then define $H \in \mathbb{C}^{2^n \times 2^n}$ to be a Hermitian matrix such that $H = H_{cl} - H_{qm}$ where $H_{cl}$ is the classical Boltzmann model $$H_{cl} = \sum_{j \in V} b_j \hat{n}_j + \sum_{k \in E} w_k \hat{n}_{k_1} \hat{n}_{k_2},$$

where $\hat{n}_j = (\mathbb{1} - \sigma_z^{(j)})/2$ and $H_{qm}$ is a matrix such that $\|H_{qm} - \text{diag}(H_{qm})\| \times 0$.

The Hamiltonian considered is of the form $$H = H_p + 1/2 H_{pq} + 1/2 H_{pqrs}, \tag{8}$$

where $$H_p = \sum_p h_p(a_p + a_p^\dagger), \tag{9}$$

$$H_{pq} = \sum_{pq} h_{pq}(a_p^\dagger a_q + a_q^\dagger a_p), \tag{10}$$

$$H_{pqrs} = \sum_{pqrs} h_{pqrs}(a_p^\dagger a_q^\dagger a_r a_s + h.c.). \tag{11}$$

Here $a_p$ and $a_p^\dagger$ are Fermionic creation and annihilation operators, which create and destroy Fermions at unit p. They have the properties that $$a^\dagger|0\rangle = |1\rangle \tag{12}$$

$$a^\dagger|1\rangle = 0 \tag{13}$$

$$a_p^\dagger a_q + a_q a_p^\dagger = \mathbb{1} \delta_{pq}. \tag{14}$$

The Hamiltonian here corresponds to the standard Hamiltonian used in quantum chemistry modulo the presence of the non-particle conserving $H_p$ term. Note that all terms in the Hamiltonian conserve the number of Fermions with the exception of $H_p$. This term is included to allow the distribution to have superpositions over different numbers of Fermions which is desirable for this model to be able to learn generative models for certain classes of pure states.

By inspection, it is clear that the number operator $n_p = a_p^{554} a_p$. This leads to the further conclusion that this Fermionic Hamiltonian reduces to the Ising model used in Boltzmann training if one sets $H_p \to 0$ and take all other non-diagonal terms in H to be 0. Therefore, apart from being difficult to simulate using quantum Monte-Carlo, this model of Fermionic Boltzmann machines encompasses traditional Boltzmann training while at the same time being expressable as $H = H_q + H_{cl}$ as per Definition 4.

C. Golden-Thompson Training

The training process for a quantum Boltzmann machine can be viewed as optimizing an objective function that measures how close the distribution generated from the model is to the underlying data distribution. The goal is to modify the Hamiltonian parameters to maximize the objective function given the data collected and the Hamiltonian model.

Here, two different forms of the objective function are considered, corresponding to POVM based training and state based training. The first, and simplest, objective function discussed is that corresponding to POVM based training. The goal of this form of training is to minimize the KL-divergence between the empirically observed data distribution in the training set and that produced by the Hamiltonian model in thermal equilibrium. Let one define the POVM to be $\Lambda := \{\Lambda_0, \ldots, \Lambda_N\}$ and further define $$\mathcal{L} := P(v|H) := Tr\left[\Lambda_v \frac{e^{-H}}{Tr[e^{-H}]}\right], \quad (15)$$

where $\mathbb{1}_h$ is the identity operator on the hidden units of the model. The KL divergence is then $$KL(P\|\mathcal{L}) = \sum_v P_v \log\left(\frac{P_v}{P(v|H)}\right), \quad (16)$$

and since $P_v$ is a constant, minimizing this objective function is equivalent to maximizing $\Sigma_v P_v \log(P(v|H))$. The latter term is known as the average log-likelihood. The objective function to be optimized is $$O_\Lambda(H;\lambda) = \sum_v P_v \log\left(\frac{Tr[\Lambda_v e^{-H}]}{Tr[e^{-H}]}\right) - \frac{\lambda}{2}\|h_Q\|^2. \quad (17)$$

where $h_Q$ is the vector of Hamiltonian terms that correspond to off-diagonal matrix elements. The last term is an $L_2$ regularization term that can be included to penalize quantum terms that are not needed to explain the data.

While this objective function is unlikely to be generically computable because the calculation of $Tr[e^{-H}]$ is a #P-hard problem, the gradients of the objective function are not hard to estimate for classical Boltzmann machines. A challenge emerges for quantum Boltzmann machines because H need not commute with its parametric derivatives. In particular, let $\theta$ be a Hamiltonian parameter then Duhamel's formula gives $Tr[\Lambda_v \partial_\theta e^{-H}]$ as $$Tr[\int_0^1 \Lambda_v e^{sH}[\partial_\theta H]e^{(1-s)H}ds]. \quad (18)$$

If $\Lambda_v$ commuted with H, then one would recover an expression for the gradient that strongly resembles the classical case.

The Golden-Thompson inequality could be used to optimize a lower bound to the objective function. Upon using this inequality, one finds the following expression for the derivative of the objective function.

$$\sum_v P_v \log\left(\frac{Tr[\Lambda_v e^{-H}]}{Tr[e^{-H}]}\right) - \frac{\lambda}{2}\|h_q\|^2 \geq \quad (19)$$

-continued $$\sum_v P_v \log\left(\frac{Tr[e^{-H+\log(\Lambda_v)}]}{Tr[e^{-H}]}\right) - \frac{\lambda}{2}\|h_q\|^2,$$

which leads to an expression analogous to the classical training. This equality is saturated when $[\Lambda_v, H_v] = 0$ as seen from the Baker-Campbell-Hausdorff formula. The gradient of the lower bound on the average log-likelihood can now be computed to be $$\sum_v P_v\left(-\frac{Tr[e^{-H_v}\partial_\theta H]}{Tr[e^{-H_v}]} + \frac{Tr[e^{-H}\partial_\theta H]}{Tr[e^{-H}]}\right) - \lambda h_\theta \delta_{H_\theta \in H_Q}, \quad (20)$$

where $H_v = H - \log \Lambda_v$. This form of training is examined below, where it will be illustrated that it yields excellent gradients in the cases considered and agrees well with the exact expectation values, as shown in the "example implementations" section below.

This form of training is incapable of learning any component of the Hamiltonian such that $Tr[e^{-H_v}\partial_\theta H] = 0$. This meant that in approaches that only considered the training data to arise from $\Lambda_v = |y_v\rangle\langle y_v|$ where $y_v$ is the binary representation of the $v^{th}$ training vector, the weights corresponding to quantum terms could not be trained directly and good values had to be guessed. Here, such approaches are eschewed by allowing $\Lambda_v$ to correspond to POVM elements that are non-diagonal in the computational basis.

Figure 2:
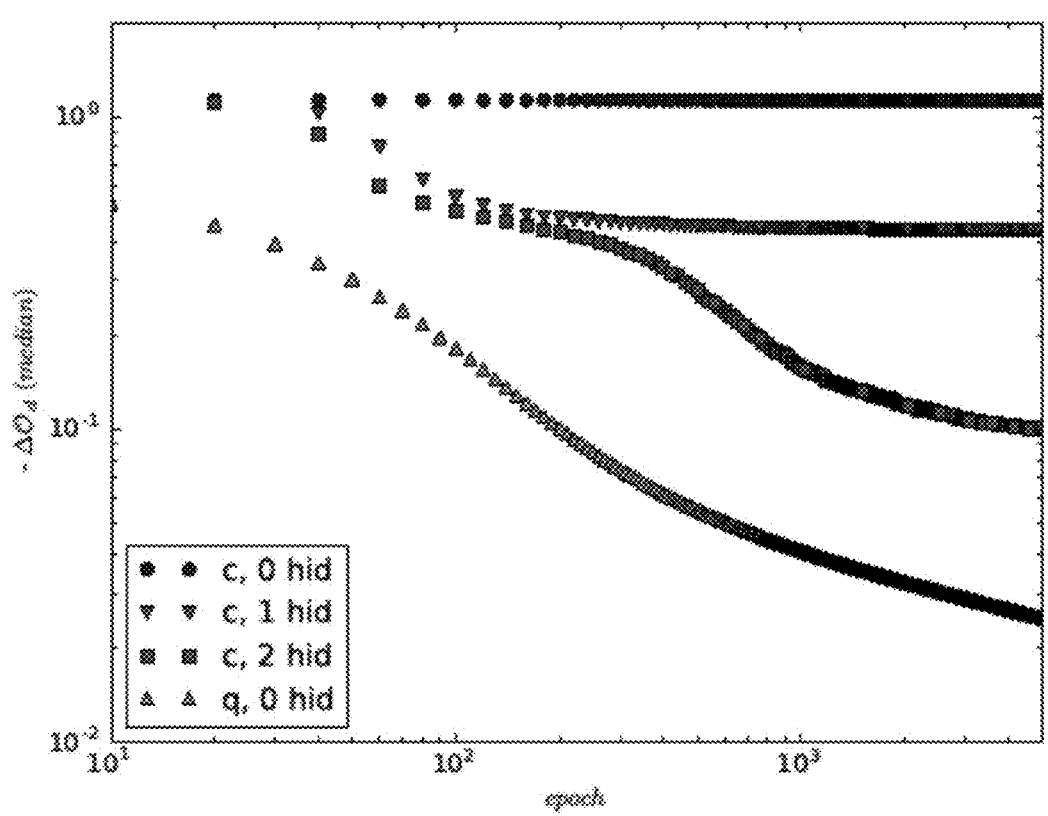
Figure 3:
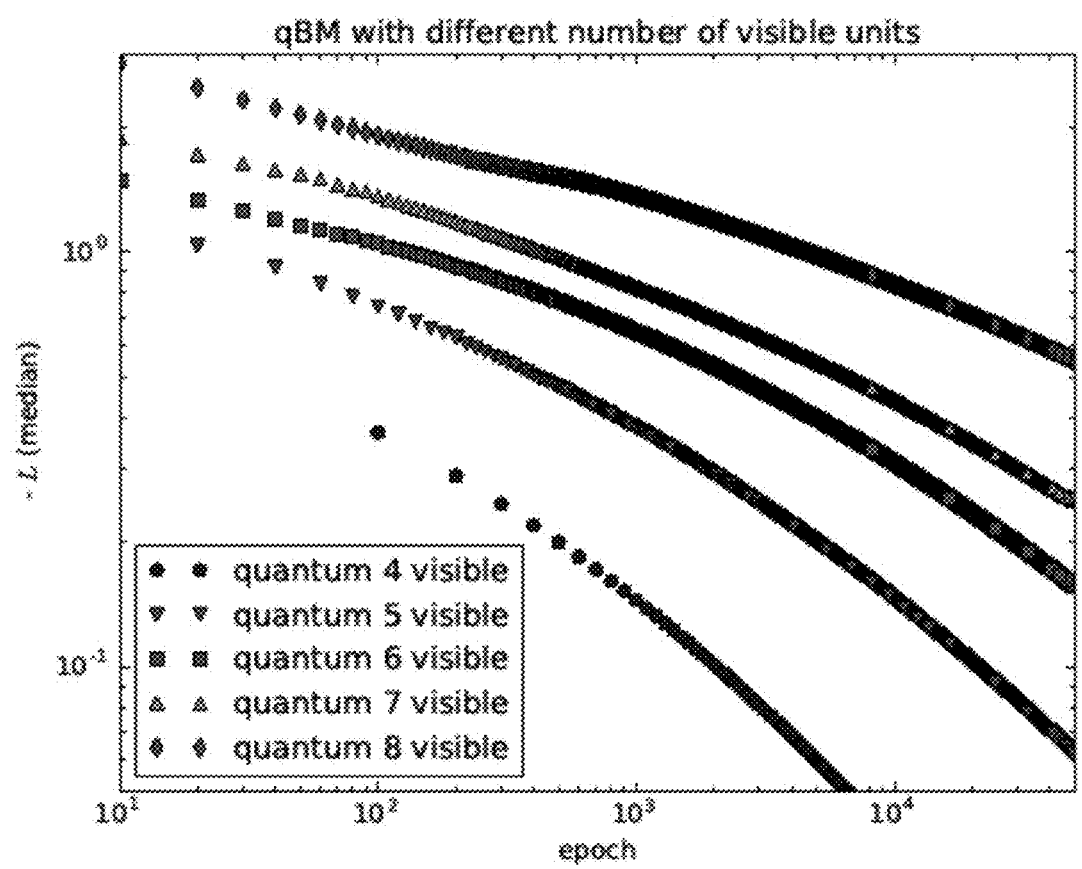
Figure 4:
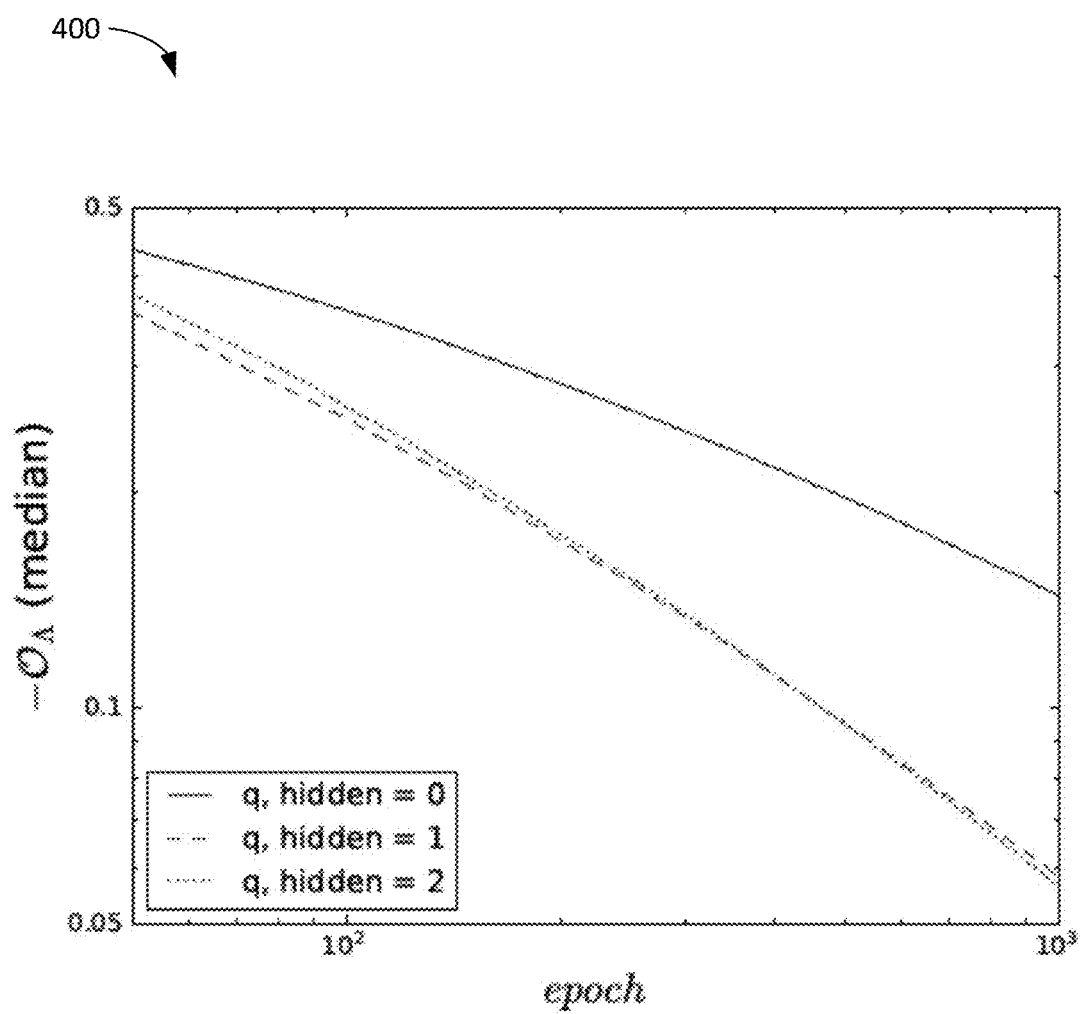

FIGS. 1-4 show simulations of QBM with POVM training. In particular, graphs 100 and 200 of FIGS. 1 and 2 compare $\mathcal{O}_{cl}$ generated by Boltzmann machine with 5 and 6 hidden units respectively. The number of hidden units were varied for quantum(q) and classical(c) Boltzmann machine with all other parameters fixed. The y axis represents the difference between $\mathcal{O}_p$ from the model disclosed herein and $\mathcal{O}_p$ of the model that learns the distribution over training data perfectly. FIG. 3 is a graph 300 that shows the performance in terms of $\mathcal{O}_p$ for all-visible quantum Boltzmann machines and other parameters optimized for performance. In graph 400 of FIG. 4, Boltzmann machines are compared with 4 visible units and different member of hidden units.

D. Relative Entropy Training

The second approach that is considered is optimizing the relative entropy instead of the average log-likelihood. In this case, the objective function to be optimized is $$O_\rho(H;\lambda) = S(\rho\|e^{-H}/Tr[e^{-H}]) - \frac{\lambda}{2}\|h_Q\|^2, \quad (21)$$

and the derivatives of the objective function are $$-Tr[\rho\partial_\theta H] - Tr[e^{-H}\partial_\theta H]/Tr[e^{-H}] - \lambda h_\theta \delta_{H_\theta \in H_Q}. \quad (22)$$

Thus, one can systematically make the state generated by a simulator of $e^{-H}/Z$ harder to distinguish from the state $\rho$, which is assumed to be able to be prepared by querying an efficient subroutine, by following a gradient given by the difference between expectations of the Hamiltonian terms in the data distribution $\rho$ and the corresponding expectation values for $e^{-H}/Z$.

$\mathcal{O}_\rho$ is motivated by the fact that $S(\rho\|e_{-H}/Z) \geq \|\rho - e^{-H}/Z\|^2/2$. In (2) if $\rho$ is positive definite. Thus if $\rho$ has maximum rank, $S(\rho\|e^{-H}/Z) \to 0$ implies $e^{-H}/Z \to \rho$.

There are two major advantages to this method. The first is that no approximations are needed to compute the gradient. The second is that this directly enables a form of tomography wherein a model for the state $\rho$ is provided by the Hamiltonian learned through the gradient ascent process. This is further interesting because this procedure is efficient, given that an accurate approximation to the thermal state can be prepared for H, and thus it can be used to describe states in high dimensions. The procedure also provides an explicit procedure for generating copies of this inferred state, unlike conventional tomographic methods.

E. Numerical Results

First, the performance of the example algorithm described above is examined for generative training using a small number of and hidden units. The result is compared to classical training. Since one can only simulate small quantum computers classically, a simple training set composed of step functions with 10% noise added to the vectors is selected. Then, a Fermionic Boltzmann machine is used to model this distribution and compare the values of the average log-likelihood observed for both models.

It was found that, in every instance examined, the quantum model does a much better job fitting the data than the classical model does. These differences are observed for both for quantum training with respect to the Golden-Thompson objective function as well as the relative entropy.

The other feature to note is that the inclusion of hidden units has a dramatic improvement on the classical model's ability to learn. In the quantum case, it is seen that even the all-visible model outperforms each of the classical cases considered. Adding a single hidden unit does substantially help in the quantum case, but additional hidden units do not provide the quantum Boltzmann machine with roach greater power for this training set.

As one extrapolates to larger Boltzmann machines, these trends continue. At a fixed number of training epochs, the quantum Boltzmann machine provides a better model for the data while requiring fewer units. These improvements in the training objective function suggest that these Fermionic quantum Boltzmann machines are superior models for data.

Figure 5:
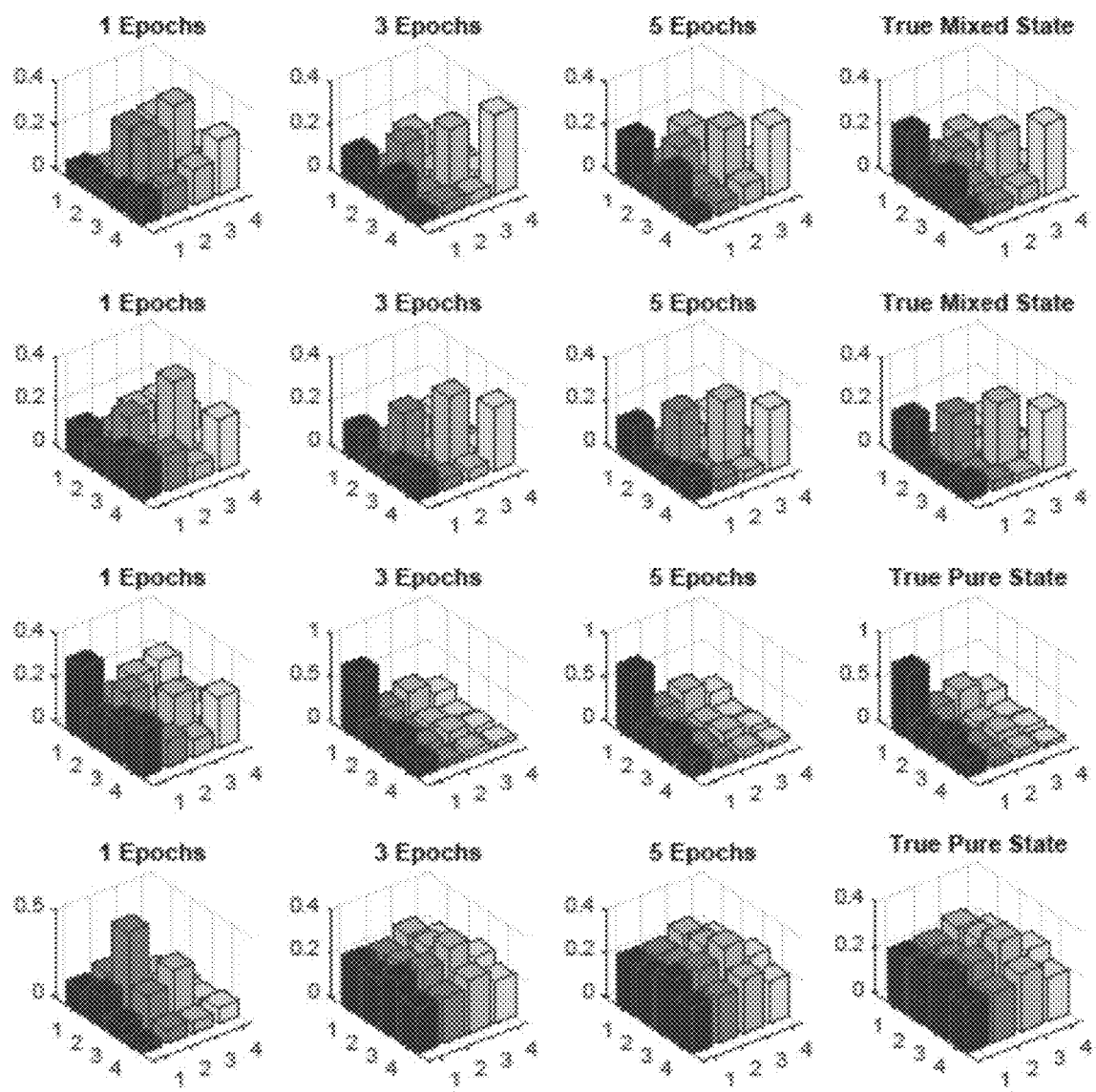
FIG. 5 show absolute values of tomographic reconstructions of random two-qubit mixed and pure states using relative entropy training.
Figure 6:
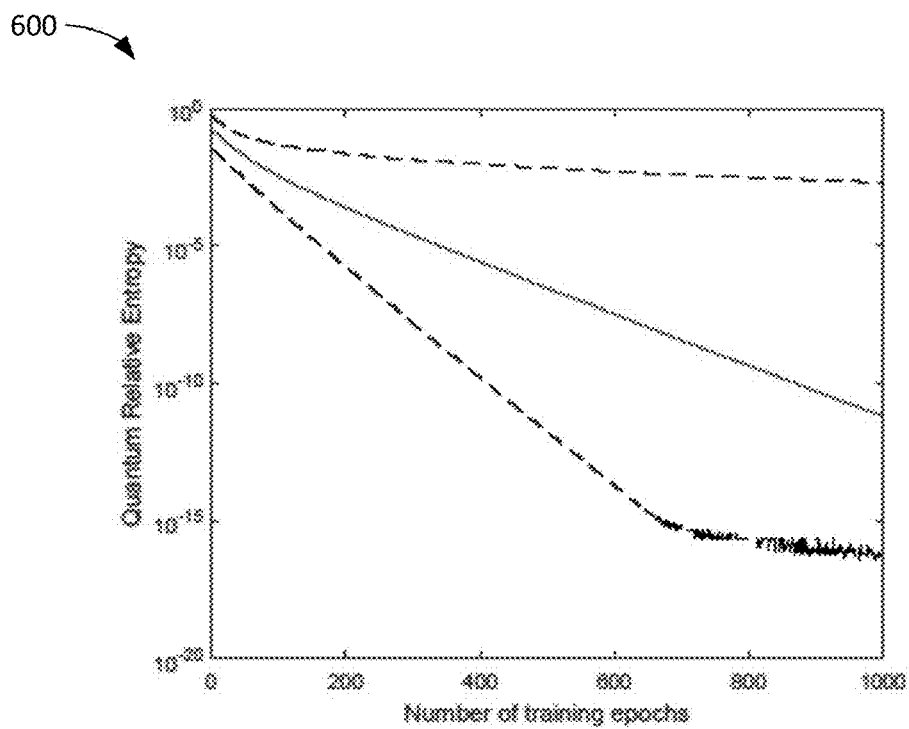
FIGS. 6-11 show the distribution of quantum relative entropies between randomly chosen mixed and pure states as a function of the number of training epochs for 2-, 3-, and 4-qubit tomographies.

Quantum Boltzmann machines can also be used to perform tomography. This is demonstrated by learning ensembles of two qubit states that are either Haar-random pure states or mixed states that are convex combinations of columns vectors of Haar-random unitary matrices with uniformly distributed weights. Here, for simplicity, a Hamiltonian is chosen comprising every 2-qubit Pauli operator. Since this set is complete, every possible state can be generated using an appropriate Hamiltonian. This is illustrated in graphs 500 shown in FIG. 5, wherein as few as 5 training epochs suffice to learn these states within graphical accuracy. In particular, the graphs of FIG. 5 show absolute values of tomographic reconstructions of random two qubit mixed and pure states using relative eat: ropy training. Further details of the error versus epoch tradeoff are provided in the "example implementations" section below.

III. Example Implementations

Preparing the Thermal State

One part of Boltzmann machine training is sampling from the thermal distribution. Preparing the thermal state, however, is NP-hard. Classical algorithms circumvent this problem by approximating it using contrastive divergence. See Geoffrey E Hinton, Training products of experts by minimizing contrastive divergence, Neural computation, 14(8): 1771-1800 (2002). Analogous quantum solutions have been proposed in David Ponlin and PawelWoejan, "Sampling from the thermal quantum gibbs state and evaluating partition functions with a quantum computer," Physical review letters, 103(22):220502 (2009); David Poulin and Pawel-Woejan, "Sampling from the thermal quantum gibbs state and evaluating partition functions with a quantum computer," Physical review letters, 103(22):220502 (2009); Nathan Wiebe, Ashish Kapoor, Christopher Granade, and Krysta M Svore, "Quantum inspired training for boltzmann machines," arXiv preprint arXiv:1507.02642 (2015). A high precision approximation can be obtained using the methods from Anirban Narayan Chowdhury and Rolando D Somma, "Quantum algorithms for gibbs sampling and hitting-time estimation," arXiv preprint arXiv:1603.02940 (2016).

The main difference between these methods is that their approach uses an integral transformation to allow the exponential to be approximated as a linear combination of unitaries. These operators are then simulated using Hamiltonian simulation ideas as well as ideas from simulating fractional queries. The complexity of preparing a Gibbs state $\rho \in \mathbb{C}^{N \times N}$ within error $\in$, as measured by the 2-norm is from Anirban Narayan Chowdhury and Rolando D Somma, "Quantum algorithms for Gibbs sampling and hitting-time estimation," arXiv preprint arXiv:1603.02940 (2016).

$$O\left(\sqrt{\frac{N}{2}} \text{polylog}\left(\frac{1}{\epsilon}\sqrt{\frac{N}{Z}}\right)\right), \quad (23)$$

for inverse temperature $\beta=1$ and cases where H is explicitly represented as a linear combination of Pauli operators. This is roughly quadratically better than existing approaches for preparing general Gibbs states if constant $\in$ is required, but constitutes an exponential improvement if $1/\in$ is large. This approach is further efficient, if $Z \in \Theta(N/\text{polylog}(N))$. This is expected if roughly a constant fraction of all eigenstates have a meaningful impact on the partition function. While this may hold in some cases, particularly in cases with strong regularization, it is not expected to hold generically. See Nathan Wiebe, Ashish Kapoor, and Krysta M Svore, Quantum deep learning, Quantum Information and Computation, 16:0541-0587 (2016); Nathan Wiebe, Ashish Kapoor, Christopher Granade, and Krysta M Svore, Quantum inspired training for Boltzmann machines, arXiv preprint arXiv: 1507.02642 (2015).

An alternative method for preparing thermal states is described in Man-Hong Yung and Alan Aspuru-Guzik. A quantum-quantum Metropolis algorithm. Proceedings of the National Academy of Sciences, 109(3):754-759 (2012). The approach works by using a Szegedy walk operator whose transition amplitudes are given by the Metropolis rule based on the energy eigenvalue difference between the two states. These eigenvalues are computed using phase estimation. A coherent analogue of the Gibbs state is found by using phase estimation on the walk operator, W, that follows these transition rules. The number of applications of control W required in the outer phase estimation loop is:

$$O\left(\frac{\|H\|^2}{\epsilon\sqrt{\delta}}\log\left(\frac{\|H\|^2}{\epsilon^2}\right)\right), \quad (24)$$

where δ is the gap of the transition matrix that defines the quantum walk, $\epsilon$ is the error in the preparation of the thermal state. Since each application of the walk operator requires estimation of the eigenvalues of H, this complexity is further multiplied by the complexity of the quantum simulation. Provided that the Hamiltonian is a sum of at most m one-sparse Hamiltonians with efficiently computable coefficients then the cost is multiplied by a factor of m log(m)/log log(m) to $m^{2+o(1)}$ depending on the quantum simulation algorithm used within the phase estimation procedure.

These features imply that it is not clear a priori which algorithm is preferable to use for preparing thermal states. For cases where the partition function is expected to be large or highly accurate thermal states are required, Eq. (23) is preferable. If the spectral gap of the transition matrix is small, quantum simulation is inexpensive H and low precision is required then Eq. (24) will be preferable.

FIGS. 6-11 are graphs 600, 700, 800, 900, 1000, and 1100 showing the distribution of quantum relative entropies between randomly chosen mixed (FIGS. 6, 8, 10) and pure (FIGS. 7, 9, 11) states as a function of the number of training epochs for 2-(FIGS. 6 and 7), 3-(FIGS. 8 and 9) and 4-(FIGS. 10 and 11) qubit tomography with n=0.025. Dashed lines represent a 90% confidence interval and the solid line denotes the median.

Figure 12:
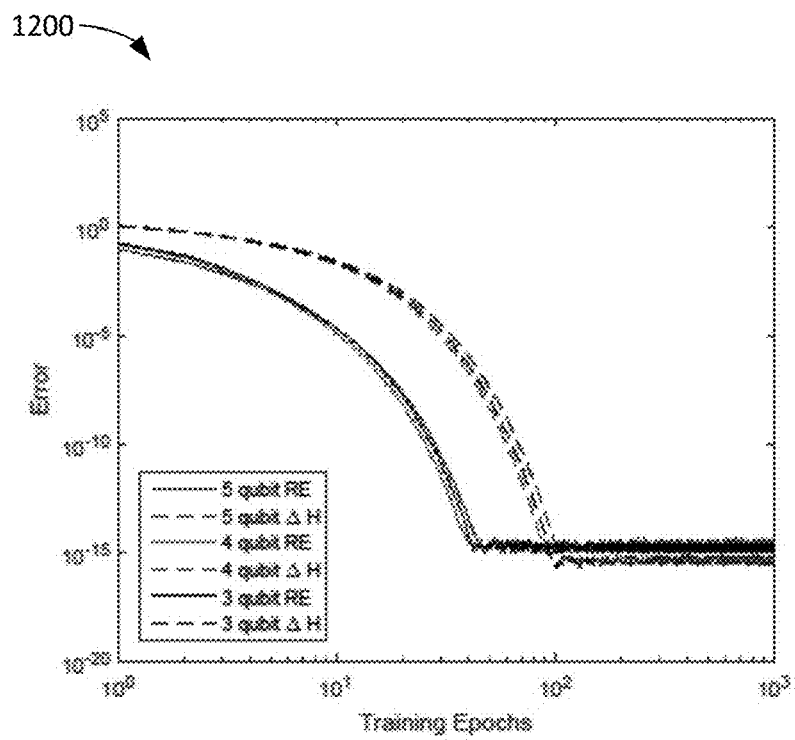
FIGS. 12 and 13 show relative entropies and Hamiltonian errors for learning transverse Ising models.
Figure 13:
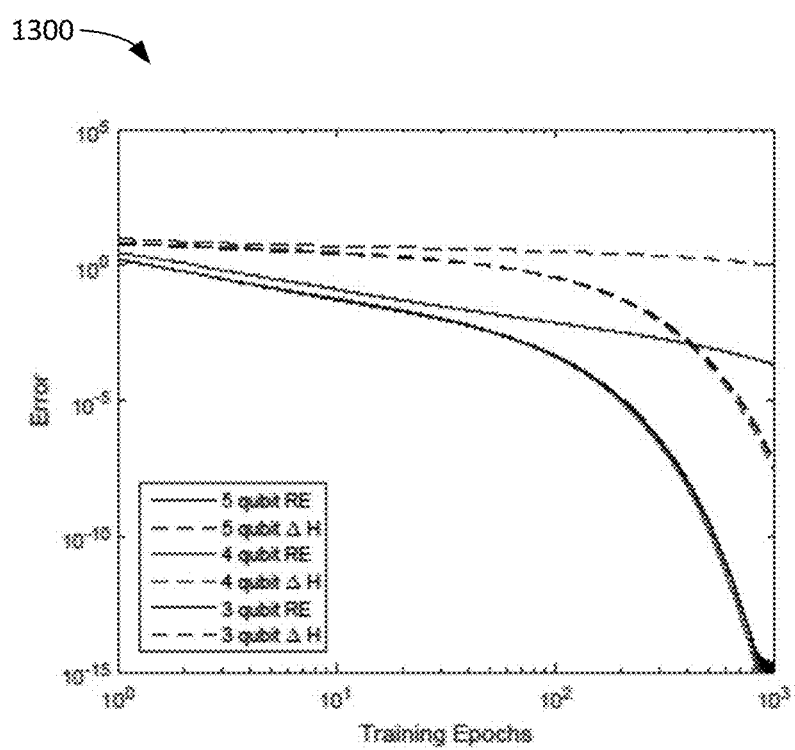

FIGS. 12 and 13 are graphs 1200 and 1300 that show the relative entropies and Hamiltonian errors for earning transverse Ising models. Graph 1200 of FIG. 12 shows data for a T1 Hamiltonian with Gaussian random terms that is rescaled to unit norm. Graph 1300 of FIG. 13 shows the analogous situation but without normalizing the Hamiltonian. Here $\Delta H = \|H_{true} - H_{est}\|_2$.

IV. RELATIVE ENTROPY TRAINING

In this section, further numerical experiments are provided that probe the performance of quantum relative entropy training. The first that is considered is illustrated in graphs 600 and 700 of FIGS. 6 and 7, which shows the performance of this form of training for learning randomly chosen 2-qubit pure and mixed states. In particular, the pure states were chosen uniformly with respect to the Haar measure and the mixed states were picked by generating the eigenvectors of Haar-random unitaries and further choosing the mixed states to be convex combinations of such states with weights that are uniformly distributed.

One can see from these experiments that the median performance of relative entropy training on mixed states is quite good. The quantum relative entropy is observed to shrink exponentially with the number of training epochs. After as few as 35 training epochs with q=1, the error is limited by numerical precision. However, a glance at the 95% confidence interval in this figure reveals that many of the examples yield much larger errors than these. Specifically after 60 epochs with the same learning rate the $97.5^{th}$ percentile of the data in Figure ?? only has a relative entropy of $10^{-5}$ and is decaying much slower than the median.

Figure 7:
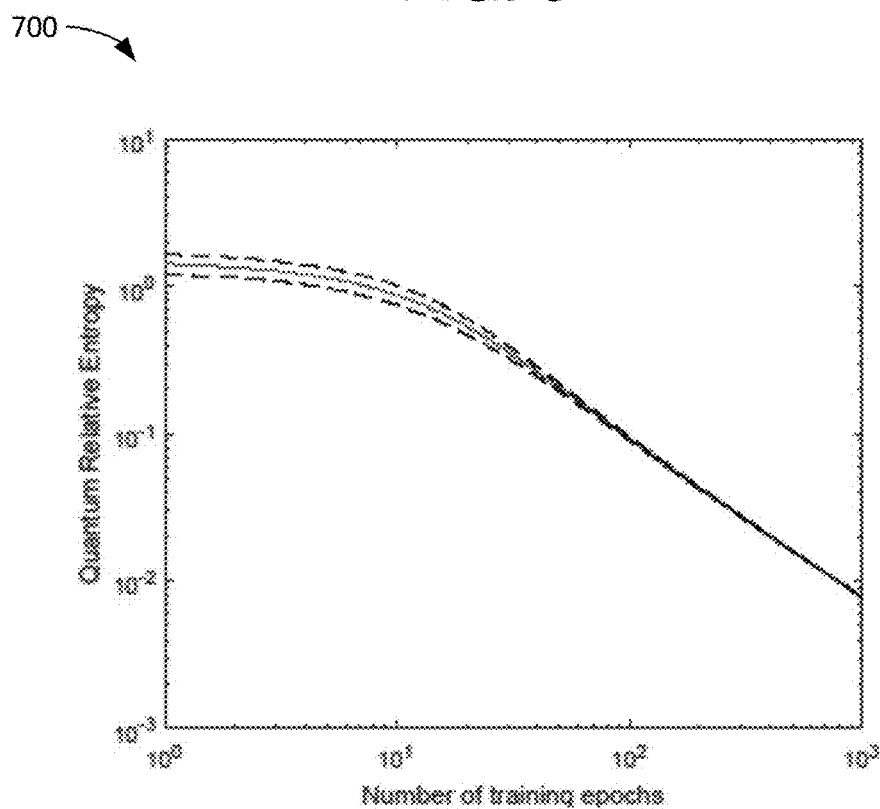
Figure 8:
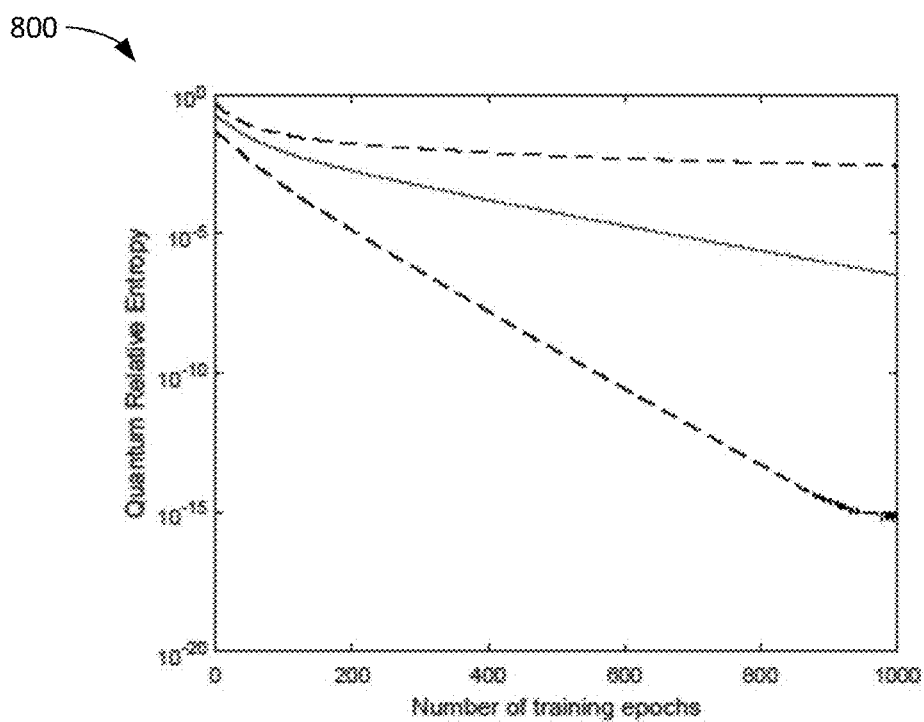
Figure 9:
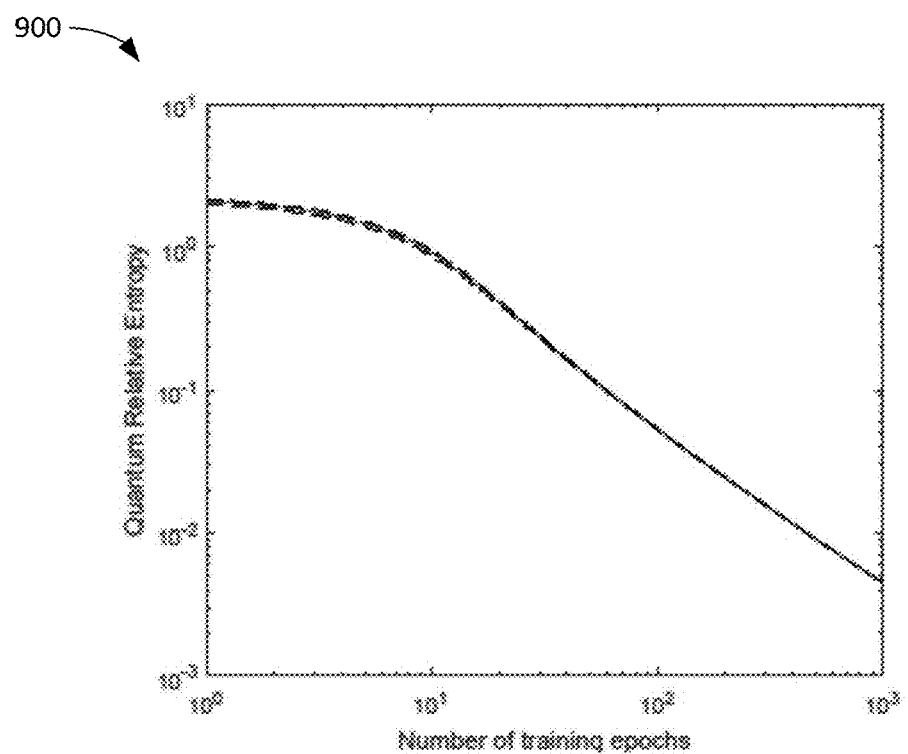
Figure 10:
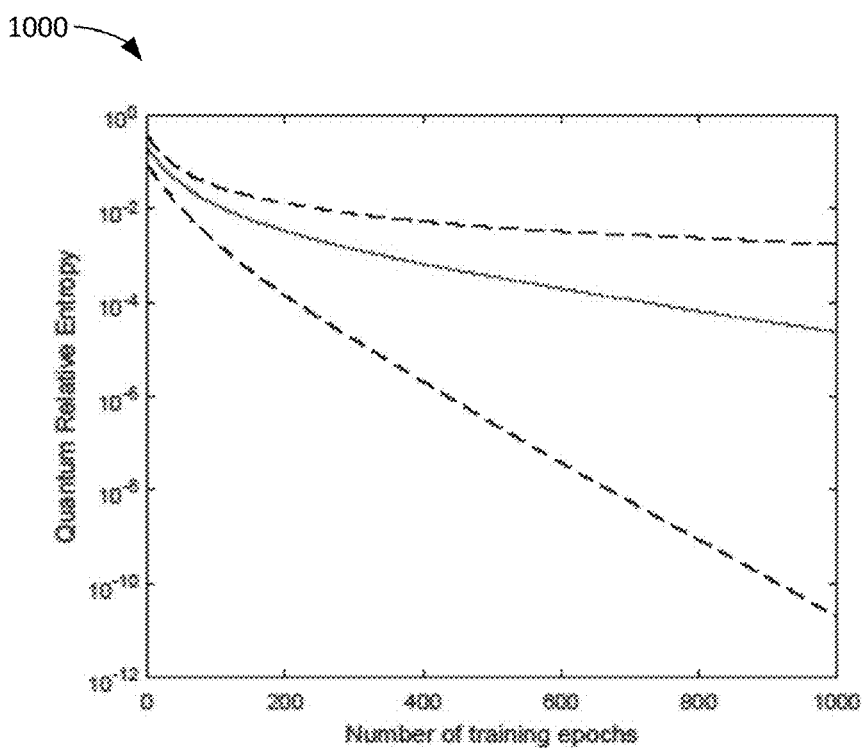
Figure 11:
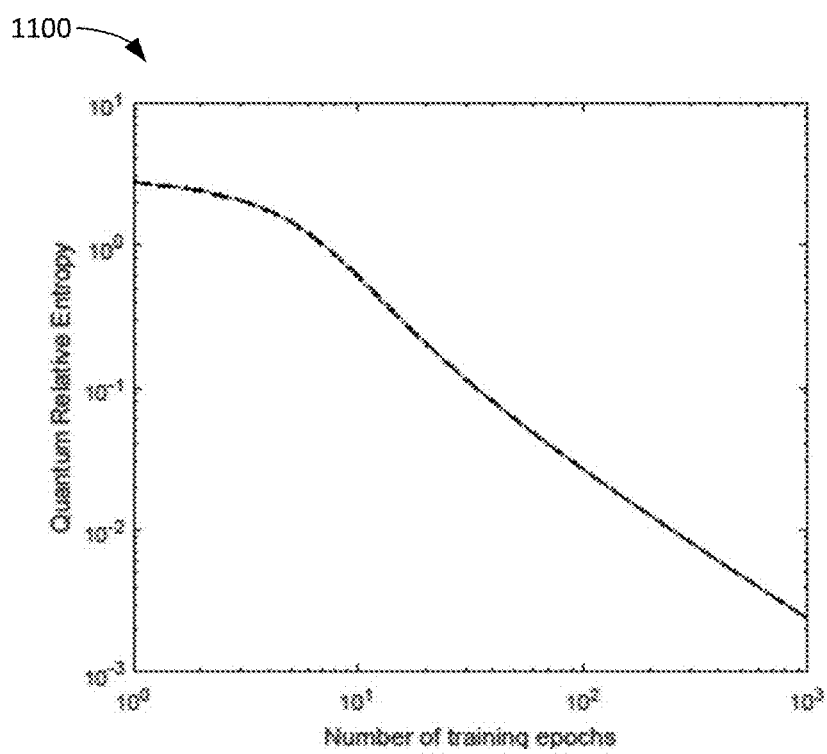

The origin of this problem can be seen from the plot of the relative entropy for pure states in FIG. 7. Pure states are observed to require many more training epochs to achieve the same accuracy as highly mixed states. This is expected because pure states are only possible in the limit as $\|H\| \to \infty$. The desirability to have large weights in the Hamiltonian not only means that more epochs will be desired to allow the weights to reach the magnitudes needed to approximate a pure state, but it also means that the training landscape is expected to be much more rough as one approaches this limit. This is what makes learning such pure states difficult. Similarly, the fat tails of the error distribution for the mixed state case makes sense given that some of the data will come from nearly pure states.

The narrowing of error bars in these plots can be understood, approximately, from Levy's lemma Levy's lemma states that for an Lipschitz continuous function mapping the unit sphere in 2N−1 dimensions (on which the pure states in $\mathbb{C}^N$ can be embedded) the probability that $f(x)$ deviates from its Haar expectation value by $\epsilon$ is in $e^{-O(N\epsilon^2)}$. Thus if one takes $f(x)=\langle x|\sigma|x\rangle$, as one increases N one expects almost all initial states chosen x uniformly at random according to the Haar measure to have the widths of their confidence intervals in $O(1/\sqrt{N}) \subseteq O(2^{-n/2})$, where it is the number of qubits. This means that one expects the width of the confidence intervals to shrink exponentially with the number of cubits for cases where the target state is pure. Similar concentrations are not necessarily expected to hold for mixed states because Levy's lemma does not directly apply in such cases.

V. APPLICATIONS TO HAMILTONIAN LEARNING

In the above applications, the aim was to learn a Hamiltonian that parameterizes a thermal state model for the training data. However, in some cases, the aim may not be to learn a particular input state but to learn a system Hamiltonian for a thermalizing system. Relative entropy training then allows such a Hamiltonian to be learned from the thermal expectation values of the Hamiltonian terms via gradient ascent and a simulator. Here, this is illustrated by moving away from a Hamiltonian model that is composed of a complete set of Pauli operators, to a local Hamiltonian model that lacks many of these terms. Specifically, a transverse Ising model is chosen on the complete graph:

$$H = \sum_j \alpha_j Z^j + \sum_j \beta_j X^j + \sum_{<i,j>} \gamma_{i,j} Z^i Z^j. \tag{25}$$

The ability of the disclosed training algorithm to reconstruct the true Hamiltonian given access to the requisite expectation values is then tested.

Apart from the simplicity of the transverse Ising model, it is also a good example because in many cases these models can be simulated efficiently using quantum Monte-Carlo methods. This means that quantum computers are not necessary for estimating gradients of models for large quantum systems.

FIGS. 12 and 13 are graphs 1200 and 1300 that show that the ability to learn such models depends strongly on the norm of the Hamiltonian, or equivalently the inverse temperature of the thermal state. It is much easier for one to learn a model using this method for a high temperature state than a low temperature thermal state. The reason for this is similar to what was observed previously. Gradient ascent takes many steps before it can get within the vicinity of the correct thermal state. This is especially clear when one notes that the error changes only modestly as one varies the number of qubits, however it changes dramatically when we vary the norm of the Hamiltonian. This means that it takes many more training epochs to reach the region where the errors shrink exponentially from the initially chosen random Hamiltonian. In cases where a good ansatz for the Hamiltonian is known, this process could be sped up.

A. Mean Field Approximations

Figure 14:
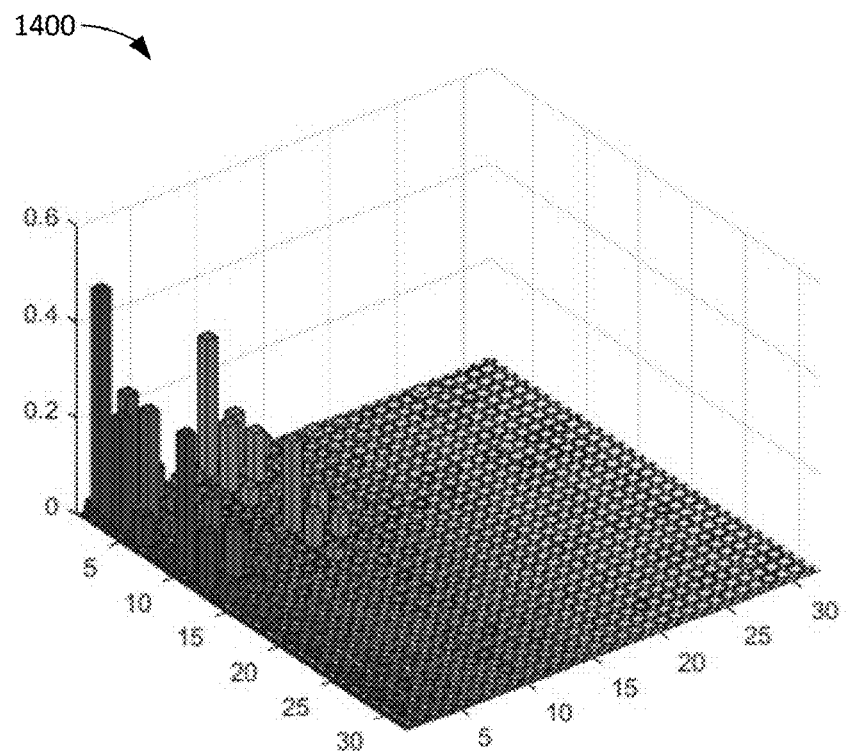
FIGS. 14-15 illustrate the absolute value of mean field approximations to the thermal state of a 5 qubit random T1 Hamiltonian where each Hamiltonian term was chosen by sampling from a Gaussian with zero mean and unit variance at $\beta=1$.
Figure 15:
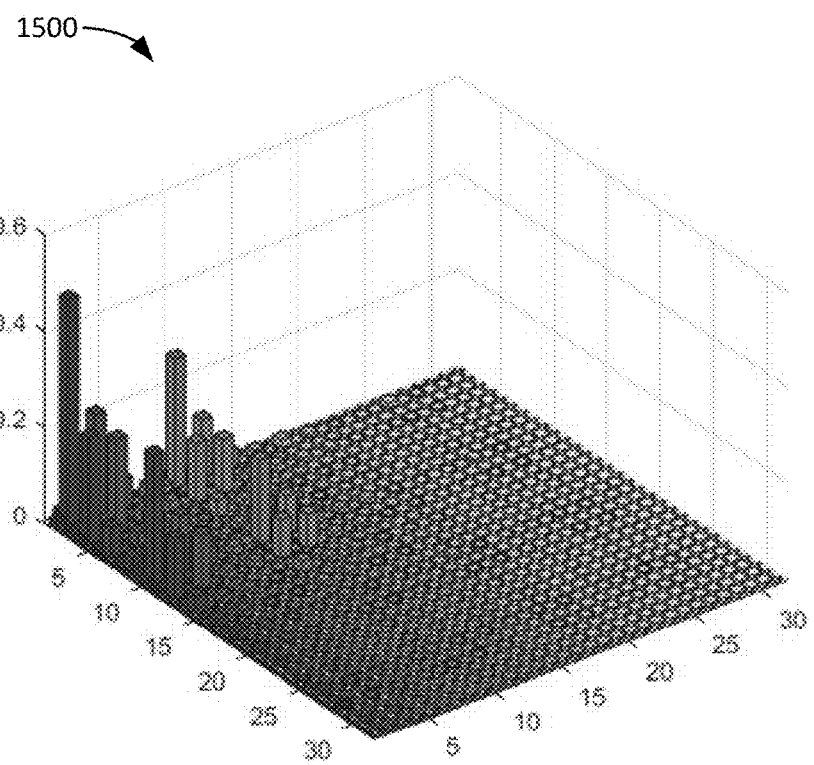
Figure 16:
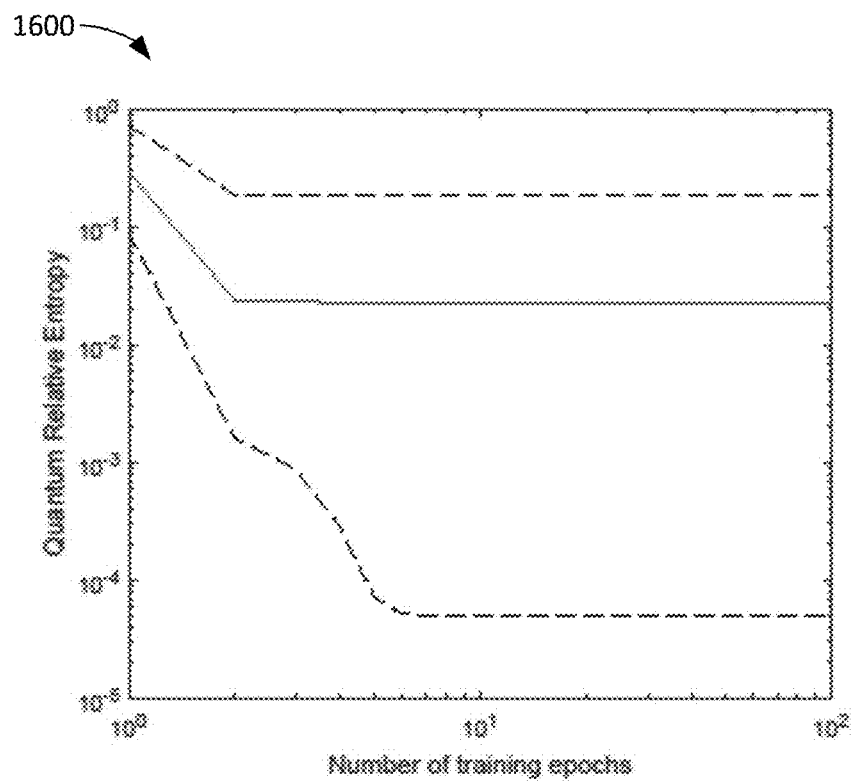
FIGS. 16-19 show median relative entropies for mean-field and true distributions for thermal states generated by transverse Ising models on the complete graph with Gaussian random coefficients chosen with zero mean and unit variance for 2, 3, 4, and 5 qubits.
Figure 17:
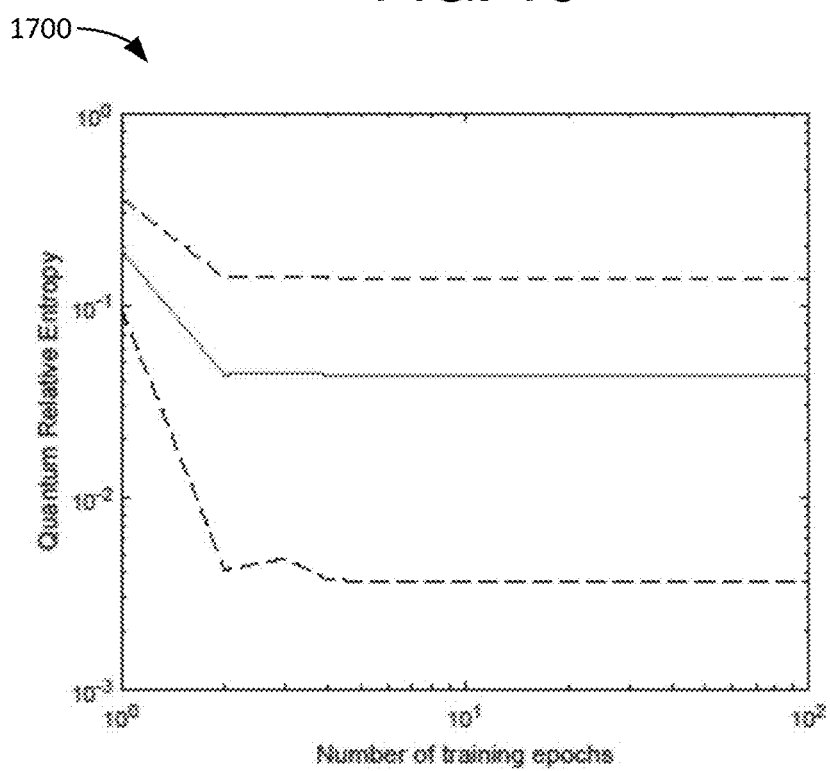
Figure 18:
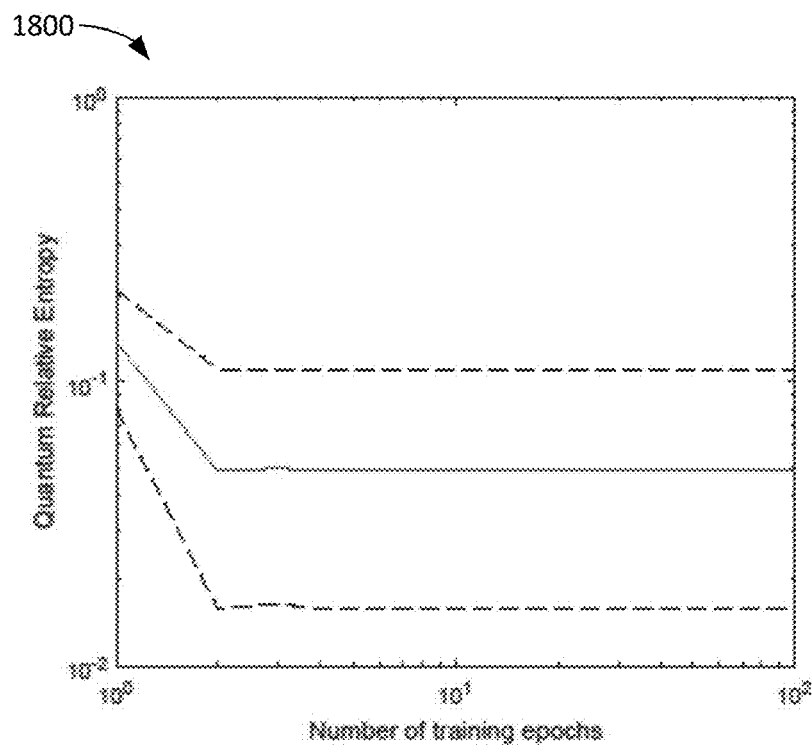
Figure 19:
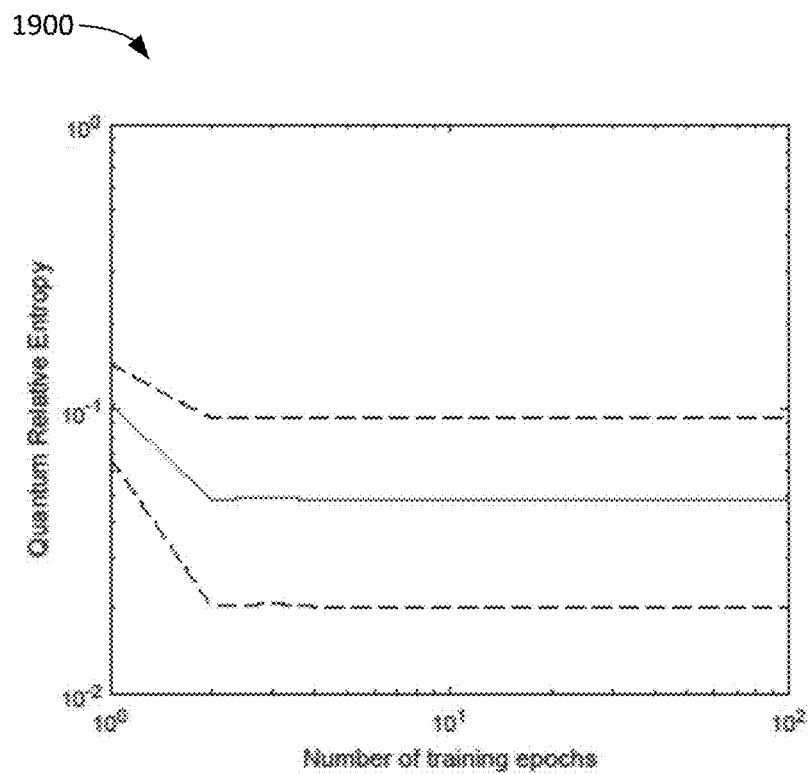

FIGS. 14-15 are graphs 1400 and 1500 that illustrate the absolute value of mean field approximations to the thermal state of a 5 qubit random T1 Hamiltonian where each Hamiltonian term was chosen by sampling from a Gaussian with zero mean and unit variance at $\beta=1$. The learning rate was taken to be $\eta=1$ and 100 training epochs were used. In particular, graph 1400 shows the thermal state for a transverse Ising model and graph 1500 shows the mean-field approximation.

FIGS. 16-19 are graphs 1600, 1700, 1800, and 1900 that show median relative entropies for mean-field and true distributions for thermal states generated by transverse Ising models on the complete graph with Gaussian random coefficients chosen with zero mean and unit variance for 2 (FIG. 16), 3 (FIG. 17), 4 (FIG. 18) and 5 (FIG. 19) qubits and $\eta=1$ was taken for each datum. Dashed lines give a 95% confidence interval.

Mean field approximations are ubiquitous in condensed matter physics. They are relatively simple to compute for some quantum systems, such as Ising models, but can be challenging for fully quantum models. Here, an example method is provided to find a mean-field Hamiltonian for a system given the ability to compute moments of the density operator $\rho$. The approach exactly follows the previous discussion, except rather than taking Eq. (26), the following is used $$H = \sum_j H_j, \qquad (26)$$

$$H_j := \alpha_j Z^j + \beta_j X^j + \gamma_j Y^j.$$

The aim is then to find vectors, $\alpha$, $\beta$ and $\gamma$ such that the correlated state $\rho$ is approximated by the uncorrelated mean field state:

$$\rho \approx e^{-H}/Z = \left[\prod_j e^{-H_j}\right]/Z. \qquad (27)$$

Apart from applications in physics, these mean-field approximations can also be invaluable in quantum deep learning. Specifically, given access to a mean-field approximation to the data distribution, it is then possible to bootstrap this idea through rejection sampling to get a more accurate approximation to the Gibbs state as per $\mathit{1}$. Here, it is shown that it is possible to achieve this for any model using quantum relative entropy training.

One can see from the data in FIGS. 14-15 that relative entropy training on a thermal state that arises from a 5 qubit transverse-Ising Hamiltonian on a complete graph for 100 training epochs yields a mean field approximation that graphically is very close to the original state. In fact if $\rho$ is the T1 thermal state and $\sigma$ is the mean-field approximation to it then $\mathrm{Tr}(\rho\sigma)\approx0.71$. This shows that the example method disclosed herein is a practical way to compute a mean field-approximation.

In order to assess how many epochs it takes in order to converge to a good mean-field approximation, one can see in FIGS. 16-19 that after only a single training epoch, the median relative entropy, over 1000 randomly chosen instances, approximately reaches its optimal value. Furthermore, it is notable that the relative entropy that the system saturates at tends to rise with the number of qubits. This is in part due to the fact that the Hamiltonian is on the complete graph and the weights are chosen according to a Gaussian distribution. One can therefore expect more correlated Hamiltonians as the number of qubits grows and in turn expect the mean-field approximation to be worse, which matches the observations discussed herein.

Turning attention to learning mean-field approximations to n-local Hamiltonians for n=2, . . . , 5 one can note that the mean-field approximation fails both qualitatively and quantitatively to capture the correlations in the true distribution. This is not surprising because such states are expected to be highly correlated and mean field approximations should fail to describe them well. These discrepancies continue even when one reduces the norm of the Hamiltonian. This illustrates that the ability to find high-fidelity mean-field approximations depends less on the number of qubits than the properties of the underlying Hamiltonian.

VI. COMMUTATOR TRAINING

Figure 20:
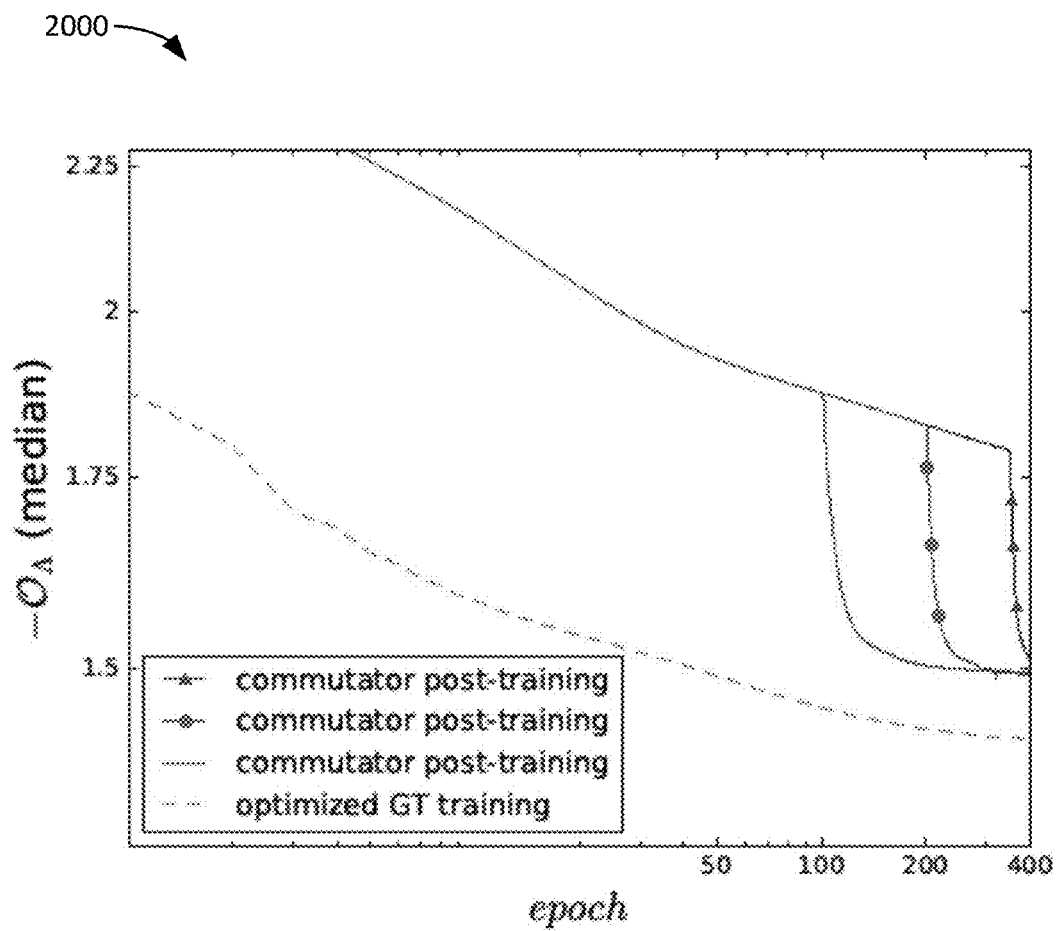
FIG. 20 is a plot show the efficacy of commutator training for all-visible Boltzmann machines with 4 visible units.

FIG. 20 is a plot 2000 showing the efficacy of commutator training for all Boltzmann machines with 4 visible units. The top lines depict training with Golden-Thompson at first and then switching to commutator training where one sees a sudden increase in accuracy. Parameters were picked such that the commutator training is stable. The bottom line (dashed) shots the performance of Golden-Thompson training with optimized learning rate and momentum.

Commutator training represents a second approach that can be taken to avoid the use of the Golden-Thompson inequality. The idea behind this approach is to approximate the series in Eq. (18) as a commutator series using Hadamard's Lemma. In particular, if the Hamiltonian is a sum of bounded Hamiltonian terms, then Eq. (18) becomes $\mathrm{Tr}[Ce^{-H}]$ for $$C := \Lambda_v\left(\partial_\theta H + \frac{[H, \partial_\theta H]}{2!} + \frac{[H, [H, \partial_\theta H]]}{3!} + \ldots \right) \qquad (28)$$

Thus the gradient of the average log-likelihood becomes $$\sum_v P_v\left(-\frac{\mathrm{Tr}[e^{-H}C]}{\mathrm{Tr}[e^{-H}]} + \frac{\mathrm{Tr}[e^{-H}\partial_\theta H]}{\mathrm{Tr}[e^{-H}]}\right) - \lambda h_\theta \delta_{H_\theta \in H_Q}. \qquad (29)$$

This commutator series can be made tractable by truncating it at low order, which will not incur substantial error if $\|[H, \partial_\theta H]\| \ll 1$. Commutator training is therefore expected to outperform Golden-Thompson training in the presence of $L_2$ regularization on the quantum terms, but is not as broadly applicable.

One can see in the plot 2000 of FIG. 20 that for a fixed learning rate that the gradients returned from a Golden-Thompson expansion are inferior to those returned from a high-order commutator expansion. This in turn illustrates the gap between the exact gradients and Golden-Thompson gradients. This is examined further by performing Golden-Thompson trainings for an all-visible Boltzmann machine with 4 visible units. One can train for a fixed number of epochs using the Golden-Thompson gradients and then switch to a $5^{th}$ order commutator expansion. In doing so, one sees a dramatic improvement in the objective function as a result. This shows that, in some circumstances, much better gradients can be found with the commutator method than with Golden-Thompson; albeit at a higher price due to the fact that more expectation values need to be measured.

A drawback of the commutator method is that it appears to be less stable than Golden-Thompson. In particular, commutator training does not fail gracefully when the expansion does not converge or when the learning rate is too large. This means that the optimal learning rate for this form of training can substantially differ from the optimal learning rate for Golden-Thompson training. When the learning rate for Golden-Thompson training is optimized, it is found that the training objective function increases by a factor of roughly 1.5, falling in line with the results seen using commutator training. This shows that while commutator training can give more accurate gradients it does not necessarily require fewer gradient steps. In practice, the method is likely to be used in the last few training epochs after Golden-Thompson training, or other forms of approximate training, reach a local optima.

VII. COMPLEXITY ANALYSIS

In this section, the following cost model is assumed. It is assumed that one has an oracle, $F_B(\in_H)$, that is capable of taking the weights biases of the quantum Boltzmann machine (or equivalently a parameterization of H) and outputs the state such that $\|\sigma - e^{-H}/Z\| \le \in_H$ for $\in_H \ge 0$. It is manifestly assumed that the state preparation is not exact because any computational model that grants the ability to prepare exact Gibbs states for arbitrary Hamiltonians is likely to be more powerful than quantum computing under reasonable complexity theoretic assumptions. For relative entropy training, it is assumed that the training data $\rho$ is provided by a query to an auxiliary oracle $F_\rho$. Both oracles are costed equivalently. Finally, it is assumed for POVM training that the POVM elements can be prepared with a constant sized circuit and do not assign a cost to implementing such a term. This is done two reasons. First, for most elementary examples, the POVM elements are very simple projectors and are not of substantially greater complexity than implementing a Hamiltonian term. The second is that incorporating a cost for them would necessitate opening the blackbox $F_H$ which would substantially complicate the discussion and force specialization to particular state preparation methods.

The first result that is shown is a lower bound based on tomographic bounds that shows that quantum Boltzmann training cannot be efficient in general if one wishes to provide a highly accurate generative model for the training data.

Lemma 1. The number of queries to $F_\rho$ which yields copies of rank r state operator $\rho \in \mathbb{C}^{D \times D}$ required to train an arbitrary quantum Boltzmann machine using relative entropy such that the quantum state generated by the Boltzmann machine are within trace distance $\epsilon \in (0, 1)$ of $\rho$, and with failure probability $\Theta(1)$, is in $\Omega(D/[\epsilon^2 \log(D/r\epsilon)])$.

Proof. The proof follows by contradiction. Since an arbitrary quantum Boltzmann machine has been assumed, a Boltzmann machine that has a complete set of Hamiltonian terms is now considered. If this assumption were not made, then there be certain density operators that cannot be prepared within error $\in$ for all $\in > 0$. Assume that $\rho$ is rank D if this is true then there exists $H \in \mathbb{C}^{D \times D}$ such that $\rho \propto e^{-H}$ because the matrix logarithm is well defined for such systems.

Now assume that $\rho$ has rank less than D. If that is the case then there does not exist $H \in \mathbb{C}^{D \times D}$ such that $\rho \propto e^{-H}$, but $\rho$ can be closely approximated by it. Let $P_0$ be a projector onto the null space of $\rho$, which assumed to be D−r dimensional. Then let $\tilde{p} \in \mathbb{C}^{r \times r}$ be the projection of p onto the orthogonal compliment of its null space. Since $\rho$ is maximum rank within this subspace, there exists $\tilde{H} \in \mathbb{C}^{r \times r}$ such that $\tilde{p}^{-\tilde{H}}$. After a trivial isometric extension of $\tilde{H}$ to $\mathbb{C}^{D \times D}$, one can then write $\rho \propto (1 - P_0) e^{-\tilde{H}} (1 - P_0)$. By construction $[\tilde{H}, (1 - P_0)] = 0$, and thus $\rho \propto (1 - P_0) e^{-\tilde{H}} - (1 - P_0) e^{-(1 - P_0) \tilde{H} (1 - P_0)}$.

The definition of the trace norm implies that for any $\gamma > 0$, $\|(1 - P_0) - e^{-\gamma P_0}\|_1 \in O[D-r] e^{-\gamma})$. Thus, because $e^{-(1 - P_0) \tilde{H} (1 - P_0)}/Z$ has trace norm 1

$$\rho = e^{-\gamma P_0} e^{-(1 - P_0) \tilde{H}(1 - P_0)} / Z + O([D-r] e^{-\gamma}). \quad (30)$$

$$\left( = e^{-(1 - P_0) \tilde{H}(1 - P_0) - \gamma P_0} / Z + O([D-r] e^{-\gamma}) \right.$$

Thus $\rho$ can be approximated within error less than $\epsilon$, regardless of its rank, by a Hermitian matrix whose norm scales at most as $O(\|\tilde{H}\| + \log(D/e))$. Thus for every $\epsilon > 0$ there exists a quantum Boltzmann machine with a complete set of Hamiltonian terms that can approximate $\rho$ within trace distance less than $\epsilon$ using a bounded Hamiltonian.

In Jeongwan Haah, Aram V Harrow, Zhengfeng Ji, Xiaodi Wu, and Nengkun Yu, "Sample-optimal tomography of quantum states," arXiv preprint arXiv:1508.01797 (2015), it is shown that in Theorem 1 of that paper that $\Omega(Dr/[\epsilon^2 \log(D/r\epsilon)])$ samples are needed to tomographically reconstruct a rank r density operator $\rho \in \mathcal{1}^{D \times D}$ within error $\epsilon$ in the trace distance. Since training a Boltzmann machine can provide a specification of an arbitrary density matrix, to within trace distance $\epsilon$, if this training process required $\omega(Dr/[\epsilon^2 \log(D/r\epsilon)])$ samples, one would violate their lower bound on tomography. The result therefore follows. □

Lemma 2. There does out exist is general purpose POVM-based training algorithm for quantum Boltzmann machines on a training set such that $|\{P_v : P_v 22\ 0\}| = N$ can prepare a thermal state such that $\text{Tr}([\Sigma_v P_v \Lambda_v] e^{-H}/Z) \ge 1/\Delta$ that requires M queries to $P_v$ where $\Delta \in o(\sqrt{N})$ and $M \in o(\sqrt{N})$.

Proof. The proof naturally follows from reducing Grover's search to Boltzmann training. Here, it is desired to use queries to the blackbox oracle to learn a whitebox oracle that one can query to learn the marked state without actually querying the original box. To be clear, let one pick $\Lambda_0 = |0\rangle \langle 0|$ and for $P_1 = 1$ and for $v > 1$, $\Lambda_c = |v\rangle \langle v|$ with $P_v = 0$. These elements form a POVM because they are positive and sum to the identity.

In the above construction the oracle that gives the $P_v$ is equivalent to the Grover oracle. This implies that a query to this oracle is the same as a query to Grover's oracle.

Now assume that one can train a Boltzmann machine such that $\text{Tr}(\Lambda_0 e^{-H}/Z) \in \omega(1/\sqrt{N})$ using $o(\sqrt{N})$ queries to the blackbox. This implies that $o(\sqrt{N})$ queries are needed on average to prepare $|0\rangle$ by drawing samples from the BM and verifying them using the oracle. Since the cost of learning the BM is also $o(\sqrt{N})$, this implies that the number of queries needed in total is $o(\sqrt{N})$. Thus, one can perform a quantum search under these assumptions using $o(\sqrt{N})$ queries and hence from lower bounds this implies $o(\sqrt{N}) \subseteq \Omega(\sqrt{N})$ which is a contradiction. □

The above lemmas preclude general efficient Bolt Wall training without further assumptions about the training data, or without making less onerous requirements on the precision of the BM model output by the training algorithm. This means that one cannot expect even quantum Boltzmann machines have limitations that need to be considered when one examines the complexity of quantum machine learning algorithms.

Theorem 1. Let $H=\Sigma_{j=1}^{M}\theta_j H_j$ with $\|H_j\|=1$ $\forall j$ be the Hamiltonian for a quantum Boltzmann machine and let G be an approximation to $\nabla \mathcal{O}$ where $\mathcal{O}$ that is the training objective function for either POVM based or relative entropy training. There exist training algorithms such that at each of the $N_{epoch}$ epochs $\mathbb{E}(\|G-G_{true}\|_2^2)\le\epsilon^2$ and query $F_H$ and the training set a number of times that is in $$O\left(N_{epoch}\left(\frac{M^2}{\epsilon^2}\right)\right).$$

Proof. The proof can be shown by considering the approximate gradients given by the methods in the main body. Since each of those methods uses sampling the result will follow from straight forward estimates of the variance. Consider an unbiased estimator of the mean such as the sample mean. Since such an estimate is unbiased it satisfies $\mathbb{E}(G)=G_{true}$. Thus $$\mathbb{E}(\|G-G_{true}\|_2^2) = \mathbb{E}(\|G-\mathbb{E}(G)\|_2^2) \quad (31)$$

$$= \sum_{j=1}^{M}\mathbb{E}((G_j-\mathbb{E}(G_j))^2)$$

$$= \sum_{j=1}^{M}\mathbb{V}(G_j).$$

For relative entropy training under the assumption that $\|H_j\|\le 1$ for all j $$\mathbb{V}(G_j)\in O(\max\{Tr(\rho H_j), Tr(H_j e^{-H}/Z)\}/n)\le 1/n. \quad (32)$$

Similarly for POVM training $$\mathbb{V}(G_j) \in O\left(\max\left\{Tr\left(H_j\sum_v \frac{P_v e^{-H_v}}{Z_v}\right), Tr\left(H_j\frac{e^{-H}}{Z_v}\right)\right\}/n\right) \in O(1/n). \quad (33)$$

Therefore $$\sum_{j=1}^{M}\mathbb{V}(G_j)\in O(M/n). \quad (34)$$

Thus if one wishes to take the overall variance to be $\epsilon^2$ it suffices to take $n=M/\epsilon^2$. Each of these a samples requires a single preparation of a thermal state and or a query to the training data. Thus for both training algorithms considered the number of queries needed to compute a component of the gradient is $O(n)$. Since there are M components the total number of queries needed to estimate the gradient is in $$O(nM)\subseteq O(M^2/\epsilon^2). \quad (35)$$

The result then follows from the assumption that the algorithm makes $N_{epoch}$ gradient steps. □

VIII: GENERAL EMBODIMENTS

This section describes several example embodiments for training a quantum Boltzmann machine implemented in a quantum computer. The disclosed tools and techniques are not to be construed as limiting in any way, as an one or more of the illustrated method acts can be performed alone or in various other combinations and subcombinations with one another. Further, any one or more of the disclosed method acts can be performed with one or more other method acts disclosed herein.

In some embodiments, the methods below are performed (at least in part) by a classical computer configured to communicate with and control a quantum computer. Still further, the method acts can be embodied as computer-executable instructions which when executed by a computer cause the computer to perform the methods.

Figure 21:
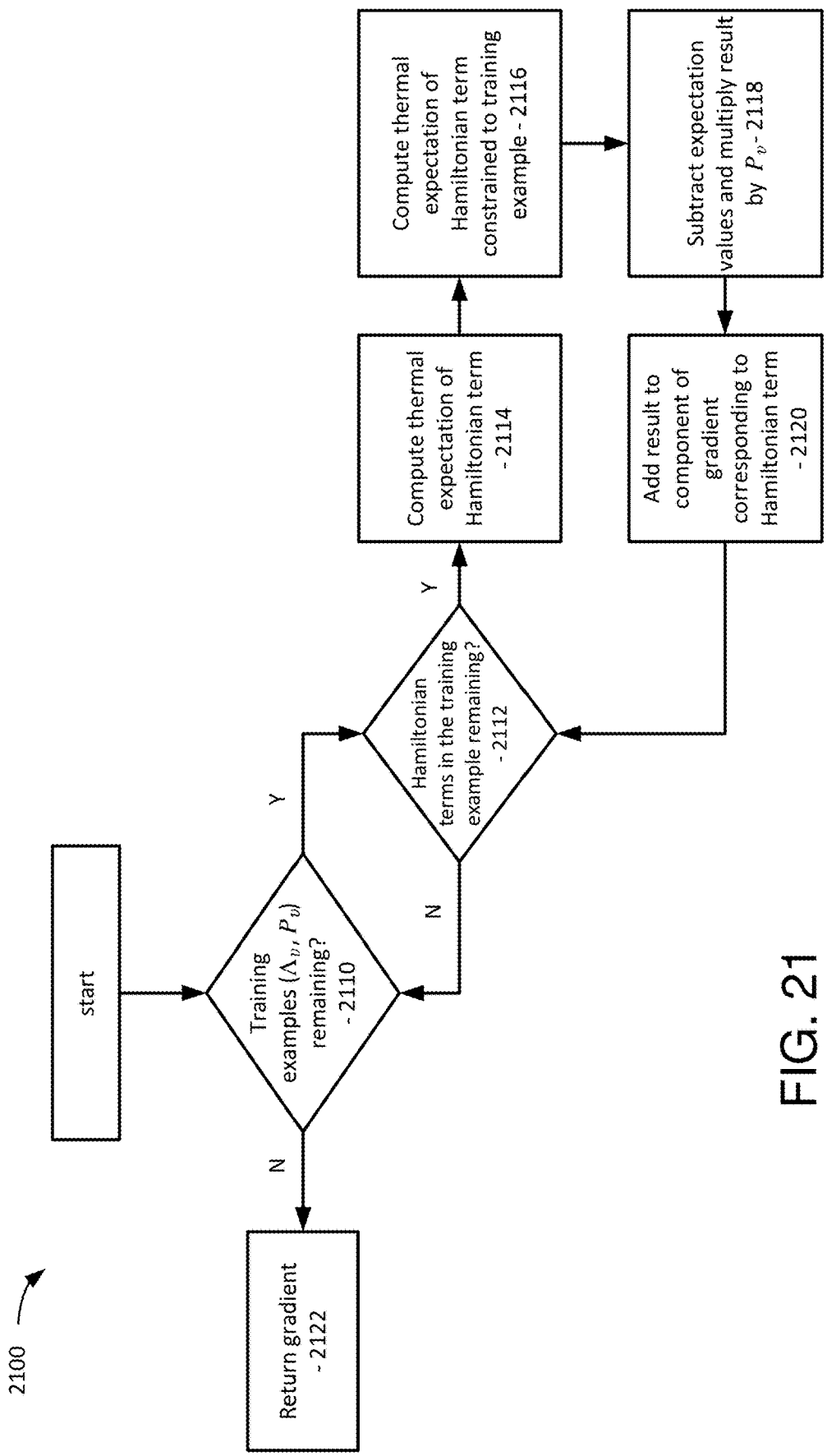
FIG. 21 is a flowchart illustrating one exemplary method for training a Boltzmann machine implemented in a quantum computing device as shown and described herein.

FIG. 21 is a flowchart illustrating one exemplary method for training a Boltzmann machine implemented in a quantum computing device as shown and described herein. The particular example shown in FIG. 21 illustrates a POVM-based technique for training a quantum Boltzmann machine. In particular, the method acts 2110-2122 of FIG. 21 are used to compute a gradient, describing how to adjust the weight of neighboring nodes in the Boltzmann machine that creates improved results of a training objective function (e.g., the gradient with the steepest improvement).

At 2110, an outer loop iterative procedure is initiated. This process involves looping over each of time training examples given in the training set. Here the training set comprises POVM elements and corresponding probabilities that describe the distribution that the user wishes to learn.

At 2112, an inner loop iterative procedure is initiated. The subsequent processes are repeated for each of the terms in the quantum Hamiltonian that describes the Boltzmann machine.

At 2114, the thermal expectation value of the Hamiltonian term is computed. This can be achieved using an algorithm for preparing thermal states using a quantum computer. The expectation value can be estimated by sampling from the quantum state or alternatively using quantum techniques such as amplitude estimation or the Hadamard test.

At 2116 the visible units in the Boltzmann machine are constrained to correspond to the POVM element in question and the hidden units are allowed to thermalize.

At 2118, expectation rattles are subtracted and the result is multiplied by $P_v$.

At 2120, the data that comes from the two expectation values are combined to compute the component of the gradient of the Golden-Thompson training objective. Note that the Golden-Thompson training objective function differs from the average log-likelihood one would theoretically want, it lower bounds the ideal training objective function so maximizing the objective function often maximizes the ideal objective function as well.

At 2122, the gradient is then returned as a classical bit string, although a quantum register could be returned in some cases. Once the gradient is computed, gradient descent optimization can be used to be able to optimize the training objective.

Figure 22:
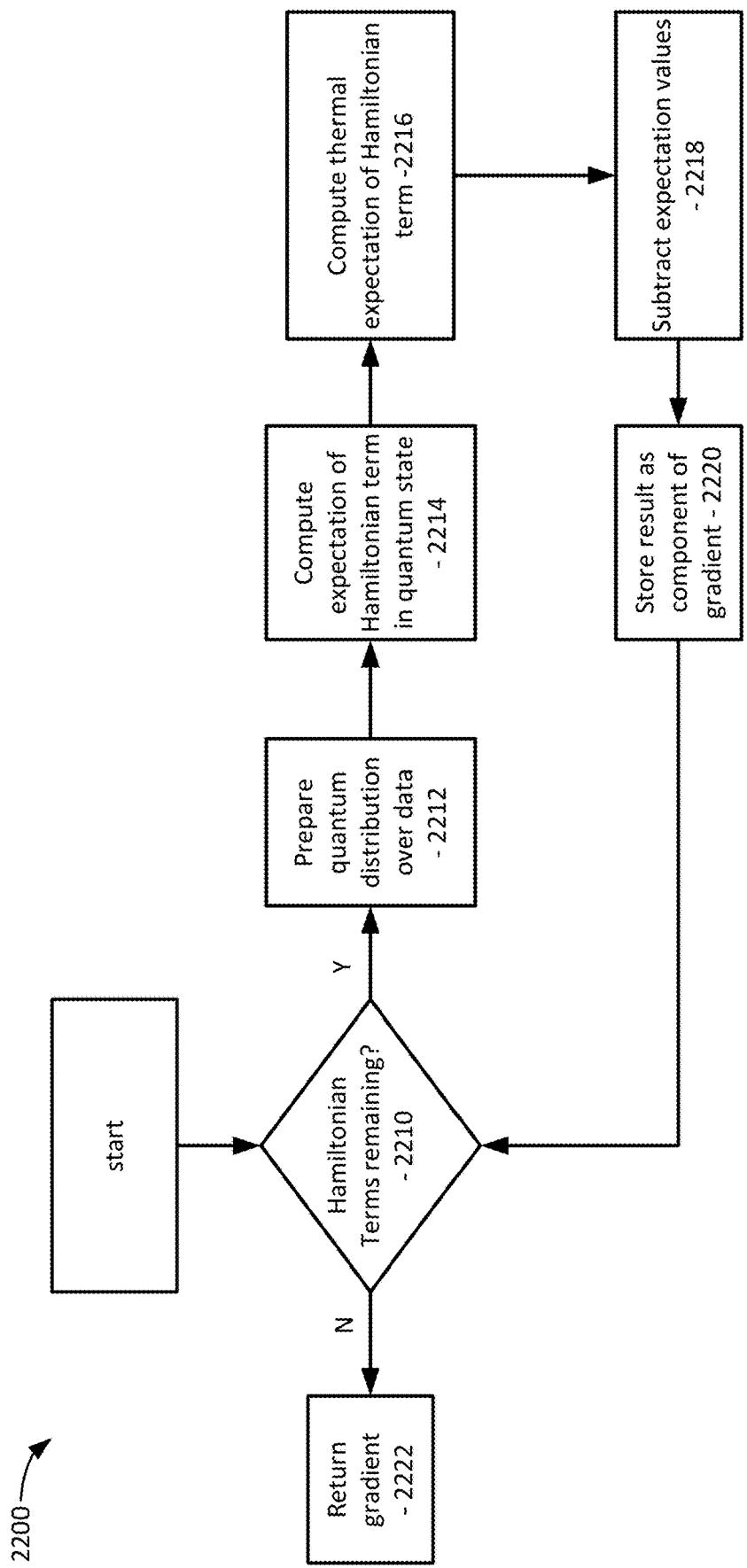
FIG. 22 is a flowchart illustrating one exemplary method for training a Boltzmann machine implemented in a quantum computing device as shown and described herein.

FIG. 22 is a flowchart illustrating one exemplary method for training a Boltzmann machine implemented in a quantum computing device as shown and described herein. The particular example shown in FIG. 22 illustrates a technique for training a quantum Boltzman machine using relative entropy. As with FIG. 21, the method acts 2200-2222 of FIG. 22 is used to determine a gradient describing how to adjust at least one of the weights between neighboring nodes in the Boltzmann machine, or a bias on one of the units, that creates improved results (e.g., gives the direction with the steepest improvement).

At 2210, an iterative procedure is initiated. In this embodiment, the procedure loops over each of the Hamiltonian terms present in the Quantum Boltzmann machine.

At 2212, the training set is prepared, which is a quantum state in this case. No POVM elements are used here because the quantum state is not assumed to be classically known in this case.

At 2214, as before, the expectation value of the Hamiltonian terms is computed. Here, the procedure shows the expectation values as part of the gradient calculation, but this phase of the procedure can also be performed offline and our method is not restricted to just computing the expectation values on the fly.

At 2216, the same process as in 2214 is performed, but instead the procedure learns the expectation value of the Hamiltonian term in the thermal state of the quantum Boltzmann machine.

At 2218, expectation rattles are subtracted.

At 2220, the results are combined with the other component of the gradient stored in the classical computer.

FIGS. 23-25 are flowcharts illustrating exemplary methods for determining the thermal averages (as is used in FIGS. 21 and 22 as part of computing the thermal expectations).

The approach illustrated by method acts 2310-2314 in FIG. 23 is unconstrained. More specifically, FIG. 23 shows the process for computing the thermal expectation value for the Hamiltonian term that is used to compute the gradient. The expectation value can be computed via sampling or alternatively can be estimated using amplitude estimation and or the Hadamard test. Several methods can be used to prepare the thermal state including quantum rejection sampling or quantum quantum metropolis sampling, but the illustrated method is no restricted to one particular method for preparing the thermal state.

The approach illustrated by method acts 2414-2414 in FIG. 24 adds a constraint and computes thermal averages for Golden-Thompson POVM training. In particular, FIG. 24 shows how the overall proves works for computing the contrained thermal expectation for the POVM element. The constraint is handled by computing the matrix logarithm of the POVM element. In the case where the POVM element is not maximum rank the POVM element can be altered by adding a negligibly small term proportional to the identity.

The approach illustrated by method acts 2510-2514 in FIG. 25 provides the structure of the method employed to compute a gradient of a training objective function based on the thermal averages required for relative entropy training or commutator training. The process in FIG. 25 is identical to that used in FIG. 24 except no thermal expectation value needs to be computed.

Figure 26:
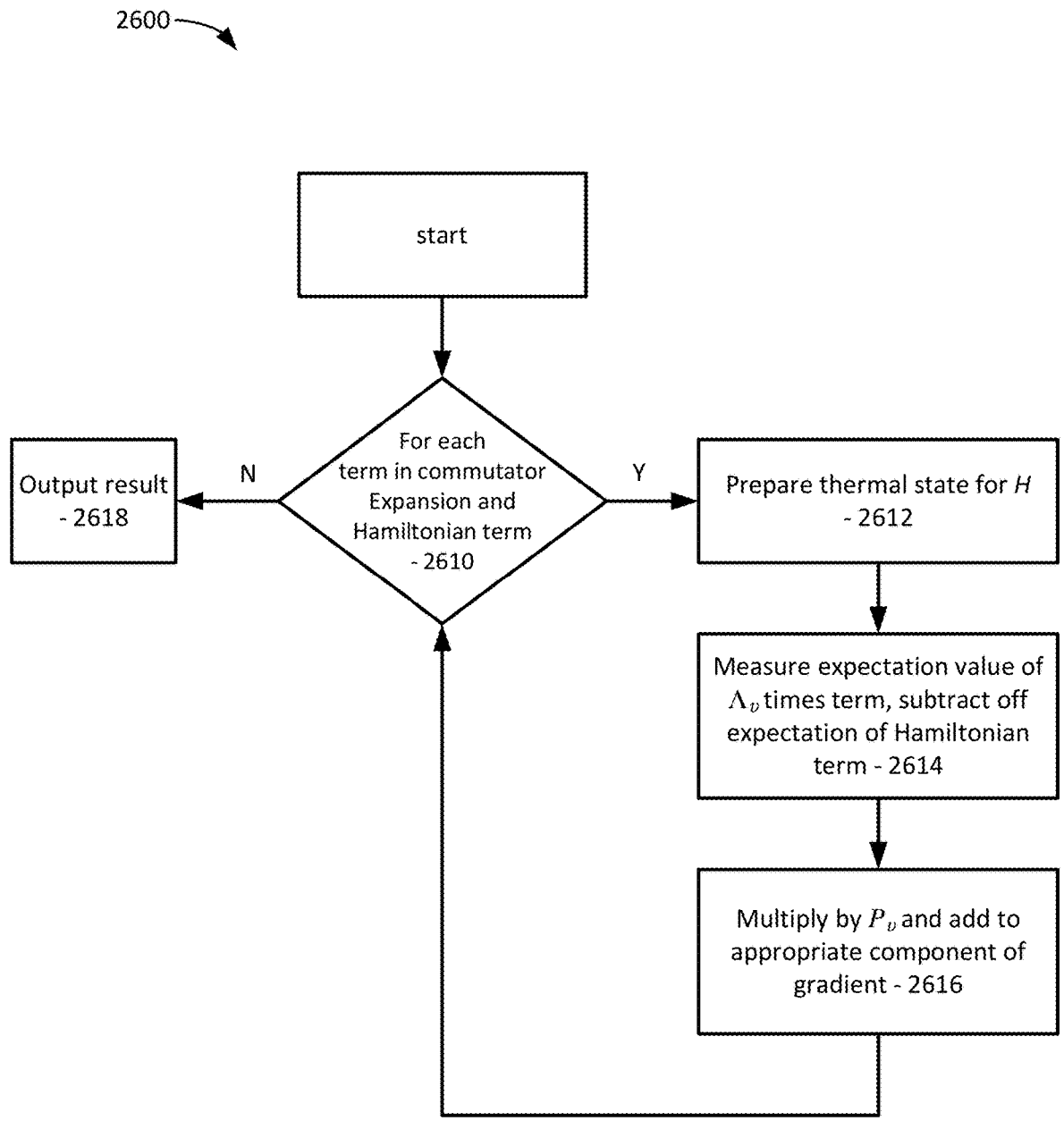
FIG. 26 is a flowchart illustrating a method for thermal state preparation for commutator POVM training as shown and described herein.

FIG. 26 is a flowchart illustrating a method for thermal state preparation for commutator POVM training as shown and described herein. In FIG. 26, as illustrated by method acts 2610-2618, a commutator-expansion approach is used.

At 2610, Hadamards lemma is used to explicitly write the derivative of the true log-likelihood function as a sum of commutators. The procedure then proceeds to compute the expectation values of the terms in the commutator expansion.

At 2612, as before, the procedure prepares a thermal state. The disclosed method is not specific to any particular thermal state preparation method.

At 2614, the expectation value now of the Hamiltonian terms and also of the commutator terms that appear in the expansion of the derivative are computed.

At 2616, the terms are combined together find the gradient as per previous steps.

At 2618, the gradients found in the steps are output as a classical bit string, but in some embodiments the procedure can also output a quantum bit register in cases where this procedure is intended to be run as part of a larger quantum algorithm.

Figure 27:
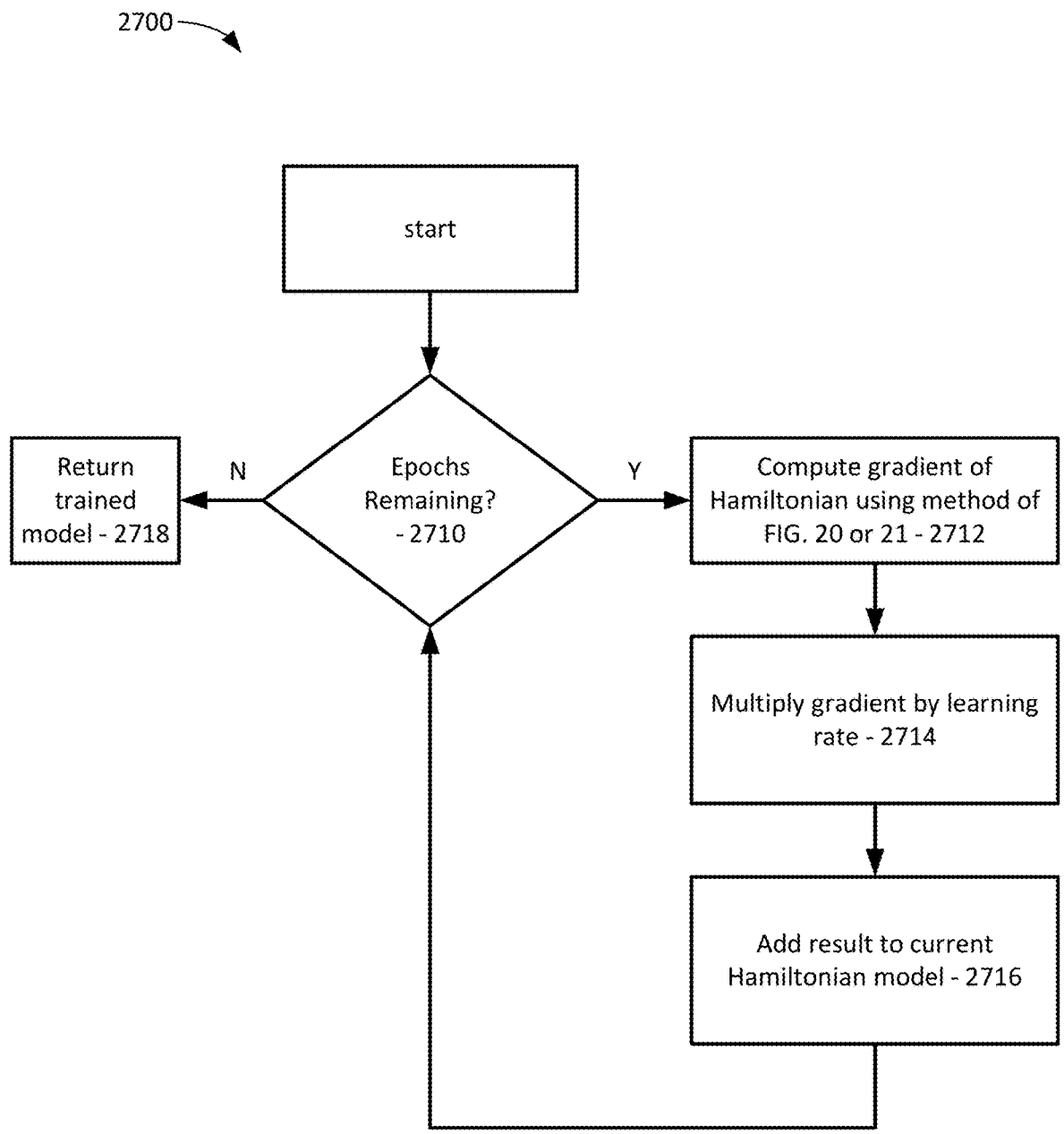
FIG. 27 is a flowchart illustrating an exemplary generalized method for training a Boltzmann machine implemented in a quantum computing device as shown and described herein.

FIG. 27 is a flowchart illustrating an exemplary generalized method for training a Boltzmann machine implemented in a quantum computing device as shown and described herein. The particular examples shown in FIG. 27 use, for instance, the methods of FIG. 21 and FIG. 22. Again, the method acts 2710-2718 illustrated in FIG. 27 are used to determine a gradient describing how to adjust at least one of the weights of neighboring nodes, or biases of one of the nodes in the Boltzmann machine that creates improved results (e.g., the gradient with the steepest improvement).

At 2710, an iterative loop is initiated. In particular, the procedure loops over every gradient step (epoch) in the optimization process.

At 2712, one of the previous methods is used to estimate the gradient of either the relative entropy or the Golden-Thompson objective function.

At 2714, the Hamiltonian terms are updated by adding to it the gradient multiplied by a learning rate, which is a typically a small constant chosen to ensure that the procedure converge even in cases where the second derivatives of the training objective function are large.

At 2716, the current estimate of the optimal Boltzmann machine is updated to correspond to the Boltzmann machine found by gradient ascent.

At 2718, once the system has gone through all of the training epochs, the optimal model is output. Simple modifications of this protocol can be also considered wherein momentum is used to circumvent regions where the gradients of the training objective function is flat or where variable learning rates are used. For ease of explanation, a simple version of the gradient ascent process is presented, but the method is not constrained to only apply to this approach.

Figure 28:
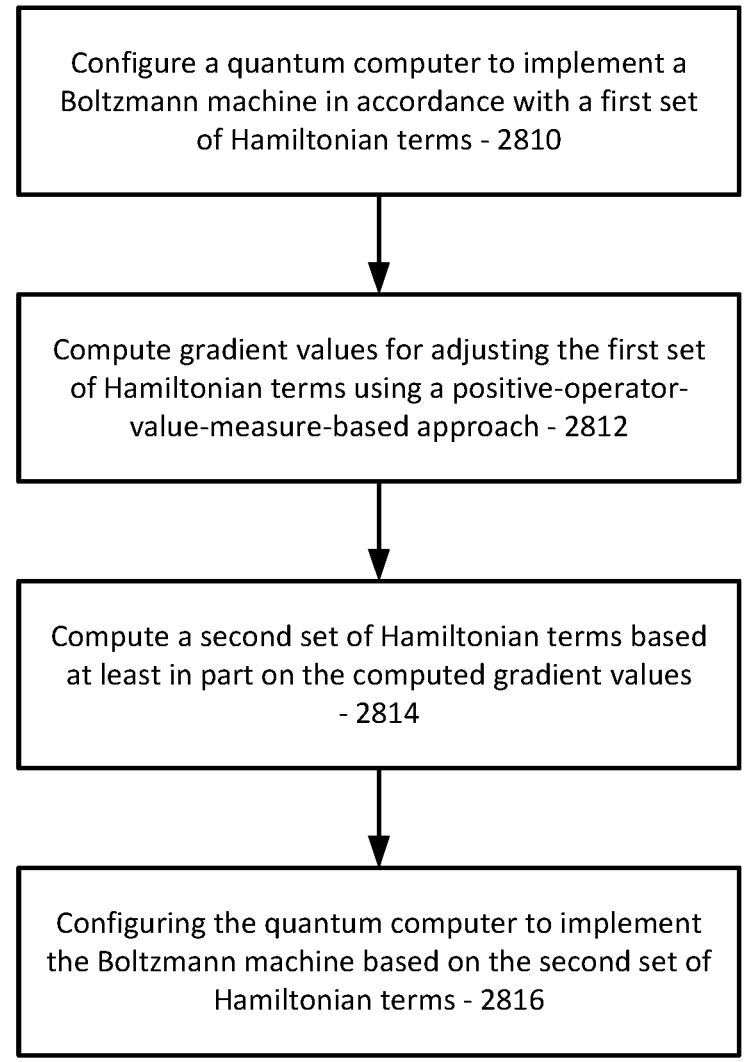
FIG. 28 is a flowchart illustrating an exemplary generalized method for training a Boltzmann machine implemented in a quantum computing device as shown and described herein.

FIG. 28 is a flowchart of an example method 2800 for controlling a quantum computer in accordance an embodiment of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

In some embodiments, the methods below are performed (at least in part) by a classical computer configured to communicate with and control a quantum computer. Still further, the method acts can be embodied as computer-executable instructions which when executed by a computer cause the computer to perform the methods.

At 2810, a quantum computer is configured to implement a Boltzmann machine in accordance with a first set of Hamiltonian terms.

At 2812, gradient values are computed for adjusting the first set of Hamiltonian terms using a positive-operator-value-measure-based approach.

At 2814, a second set of Hamiltonian terms is computed based at least in part on the computed gradient values. In some examples, the computing the second set of Hamiltonian terms comprises multiplying the gradient values by a selected learning rate.

At 2816, the quantum computer is configured to implement the Boltzmann machine in accordance with the second set of Hamiltonian terms. In some examples, the second set of Hamiltonian terms causes the Boltzmann machine to implement a second Hamiltonian that more likely reproduces a training set of data than a first Hamiltonian resulting from the first set of Hamiltonian terms.

In simile embodiments, the computing; the gradient values comprises, for a respective Hamiltonian term, comprises: computing a first thermal expectation of the respective Hamiltonian term; computing a second thermal expectation of the respective Hamiltonian term constrained to a training example; computing a difference between the first thermal expectation and the second thermal expectation; and computing the gradient value for the respective Hamiltonian by multiplying the difference by a probability distribution. In some examples, the probability distribution is a uniform probability distribution.

In certain embodiments, the gradient values are computed at least in part from a first thermal expectation of the respective Hamiltonian term and a second thermal expectation of the respective Hamiltonian term constrained to a training set. In some examples, the first thermal expectation of the respective Hamiltonian term is computed by: preparing a thermal state for a Hamiltonian model represented by the first Hamiltonian terms; and measuring an expectation value for the respective Hamiltonian term from the prepared thermal state. Further, in certain examples, the second thermal expectation of the respective Hamiltonian term is computed by: preparing a thermal state for a modified Hamiltonian model represented by the first Hamiltonian terms with an added positive-operator-value-measure constraint; and measuring an expectation Value for the respective Hamiltonian term from the prepared thermal state.

In some embodiments, the Hamiltonians implemented by the first Hamiltonian terms and the second Hamiltonian are non-stoquastic Hamiltonians. In certain embodiments, the method is performed using measurement records that result from using measurement operators that do not solely project onto the computational basis. In some embodiments, the method is performed using at least one POVM constraint that does not solely project onto the computational basis.

Figure 29:
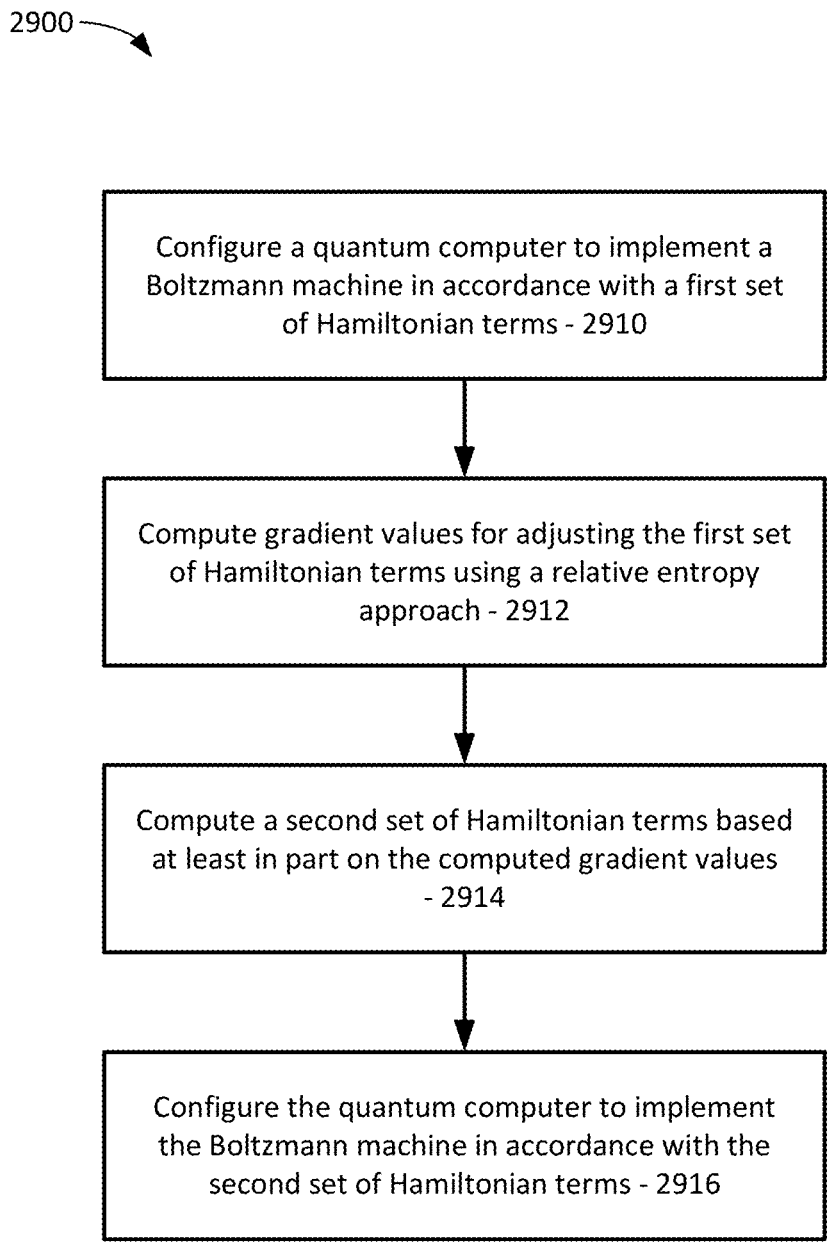
FIG. 29 is a flowchart illustrating an exemplary generalized method for training a Boltzmann machine implemented in a quantum computing device as shown and described herein.

FIG. 29 is a flowchart of another example method 2900 for controlling a quantum computer in accordance an embodiment of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein. In some embodiments, the methods below, are performed by a classical computer configured to communicate with and control a quantum computer. Still further, the method acts can be embodied as computer-executable instructions which when executed by a computer cause the computer to perform the methods.

At 2910, a quantum computer is configured to implement a Boltzmann machine in accordance with a first set of Hamiltonian terms.

At 2912, gradient values are computed for adjusting the first set of Hamiltonian terms using a relative entropy approach. For example, the relative entropy approach uses a relative entropy between an input state and the state output by the Boltzmann machine.

At 2914, a second set of Hamiltonian terms is computed based at least in part on the computed gradient values. In some embodiments, the computing the second set of Hamiltonian terms comprises multiplying the gradient values by a selected learning rate.

At 2916, the quantum computer is configured to implement the Boltzmann machine in accordance with the second set of Hamiltonian terms.

In some embodiments, the second set of Hamiltonian terms cause the Boltzmann machine to implement a second Hamiltonian that more likely reproduces a training set of data than a first Hamiltonian resulting from the first set of Hamiltonian terms.

In certain embodiments, the computing the gradient values comprises, for a respective Hamiltonian term, comprises: preparing a quantum data distribution; computing an expectation of the respective Hamiltonian term from the quantum data distribution; computing a thermal expectation of the respective Hamiltonian term; computing a difference between the expectation and the thermal expectation; and computing the gradient value for the respective Hamiltonian by multiplying the difference by a probability distribution. In some examples, the quantum data distribution corresponds to a target quantum state selected by a user.

In some embodiments, the gradient values are computed at least in part from a data-distribution expectation of the respective Hamiltonian term and a thermal expectation of the respective Hamiltonian term. In some examples, the data-distribution expectation is computed by taking a thermal average against a state that is not a mixed state in the computational basis.

In certain embodiments, the thermal expectation is computed by a Szeggedy walk designed to prepare an approximation to the thermal distribution, or a method based on quantum rejection sampling or linear-combinations of unitaries to refine an initial approximation to the thermal state into the exact thermal state or a close approximation thereof. In some embodiments, the data-distribution expectation is given by a polyonomial size quantum circuit that is either an apriori known function or is found through optimization such as in variational quantum eigensolvers.

In certain embodiments, the expectation of the respective Hamiltonian term is computed by: preparing a quantum data distribution; and measuring an expectation value for the respective Hamiltonian term from the quantum data distribution. In some embodiments, the thermal expectation of the respective Hamiltonian term is computed by: preparing a thermal state for a Hamiltonian model represented by the first Hamiltonian terms; and measuring an expectation value for the respective Hamiltonian term from the prepared thermal state.

In some embodiments, the computing the second set of Hamiltonian terms is performed without using a Golden-Thompson inequality. In certain embodiments, the Hamiltonians implemented by the first Hamiltonian terms and the second Hamiltonian are non-stoquastic Hamiltonians.

Figure 30:
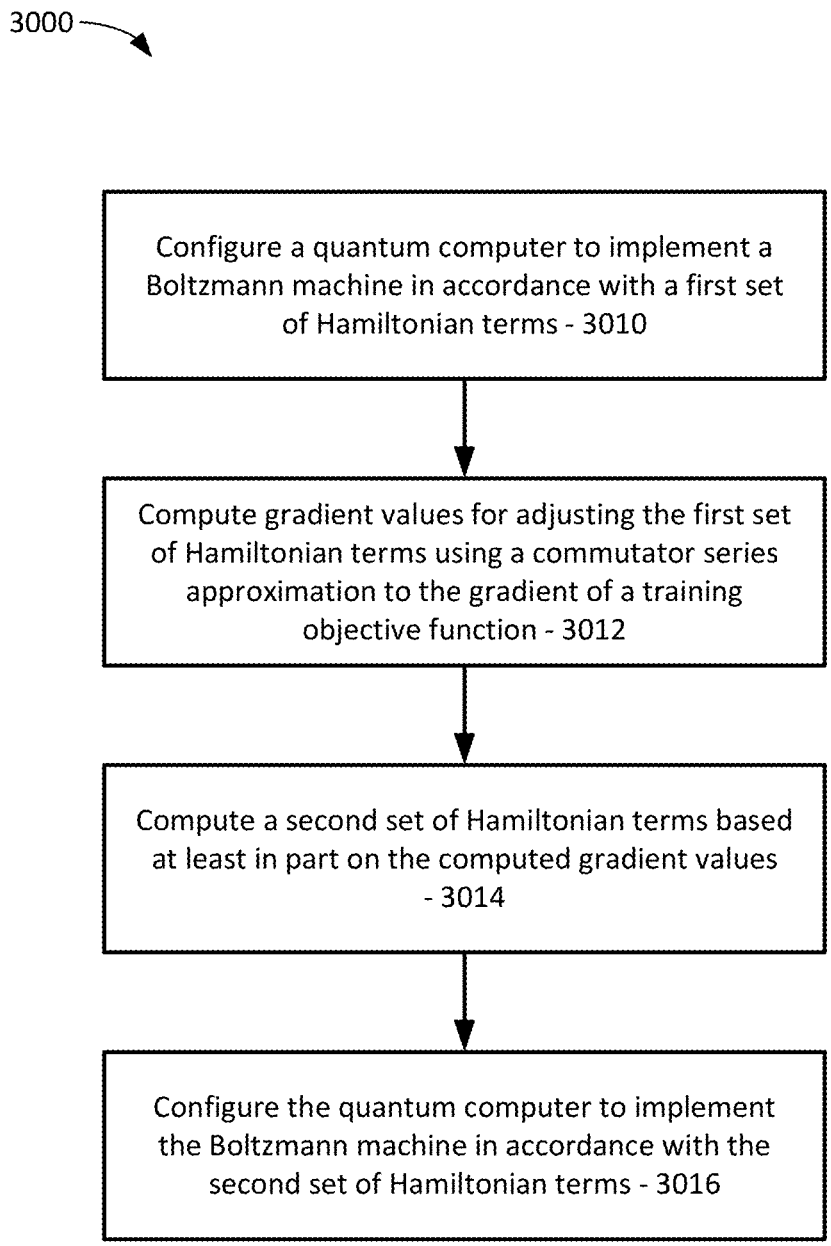
FIG. 30 is a flowchart illustrating an exemplary generalized method for training a Boltzmann machine implemented in a quantum computing device as shown and described herein.

FIG. 30 is a flowchart of another example method 3000 for controlling a quantum computer in accordance an embodiment of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

In some embodiments, the methods below are performed by a classical computer configured to communicate with and control a quantum computer. Still further, the method acts can be embodied as computer-executable instructions which when executed by a computer cause the computer to perform the methods.

At 3010, a quantum computer is configured to implement a Boltzmann machine in accordance with a first set of Hamiltonian terms.

At 3012, gradient values are computed for adjusting the first set of Hamiltonian terms using a commutator series approximation to the gradient of a training objective function. In some examples, the commutator series approximation approach uses commutator expansions of a derivative of an average log-likelihood. In further examples, the commutator series approximation is provided by a user.

At 3014, a second set of Hamiltonian terms is computed based at least in part on the computed gradient values.

At 3016, the quantum computer is configured to implement the Boltzmann machine in accordance with the second set of Hamiltonian terms.

In some embodiments, the second set of Hamiltonian terms cause the Boltzmann machine to implement a second Hamiltonian that more likely reproduces a training set of data than a first Hamiltonian resulting from the first set of Hamiltonian terms.

In certain embodiments, the computing the gradient values comprises: computing commutator expansions of the commutator series approximation: for a respective term in a respective one of the commutator expansions: preparing a thermal state for a Hamiltonian model represented by the first Hamiltonian terms; and measuring an expectation value for the respective Hamiltonian term from the prepared thermal state.

In some embodiments, the computing tale second set of Hamiltonian terms is performed without using a Golden-Thompson inequality. In certain embodiments, the Hamiltonians implemented by the first Hamiltonian terms and the second Hamiltonian are ion-stoquastic Hamiltonians.

IX. EXAMPLE COMPUTING ENVIRONMENTS

Figure 31:
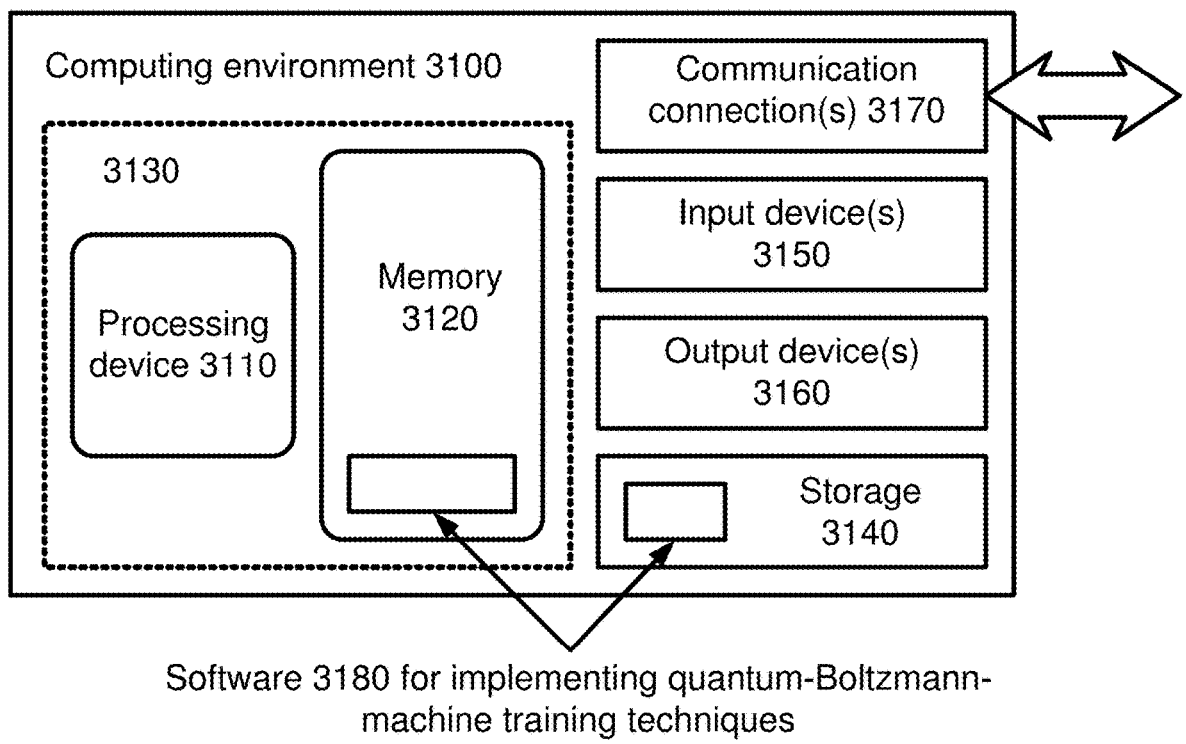
FIG. 31 illustrates a generalized example of a suitable computing environment in which several of the described embodiments can be implemented.

FIG. 31 illustrates a generalized example of a suitable computing environment 3100 in which several of the described embodiments can be implemented. The computing environment 3100 is not intended to suggest any limitation as to the scope of use or functionality of the disclosed technology, as the techniques and tools described herein can be implemented in diverse general-purpose or special-purpose environments that have computing hardware.

With reference to FIG. 31, the computing environment 3100 includes at least one processing device 3110 and memory 3120. In FIG. 31, this most basic configuration 3130 is included within a dashed line. The processing device 3110 (e.g., a CPU or microprocessor) executes computer-executable instructions. In a multi-processing system, multiple processing devices execute computer-executable instructions to increase processing power. The memory 3120 may be volatile memory (e.g., registers, cache, RAM, DRAM, SRAM), non-volatile memory (e.g., ROM, EEPROM, flash memory) or some combination of the two. The memory 3120 stores software 2880 implementing tools for implementing the quantum circuit (e.g., quantum Boltzmann machine) training techniques described herein.

The computing environment can have additional features. For example, the computing environment 3100 includes storage 3140, one or more input devices 3150, one or more output devices 3160, and one or more communication connections 3170. An interconnection mechanism (not shown), such as a bus, controller, or network, interconnects the components of the computing environment 3100. Typically, operating system software (not shown) provides an operating environment for other software executing in the computing environment 3100, and coordinates activities of the components of the computing environment 3100.

The storage 3140 can be removable or non-removable, and includes one or more magnetic disks (e.g., hard drives), solid state drives (e.g., flash drives), magnetic tapes or cassettes, CD-ROMs, DVDs, or any (After tangible non-volatile storage medium which can be used to store information and which can be accessed the computing environment 3100. The storage 3140 can also store instructions for the software 3180 implementing the quantum circuit (e.g., quantum Boltzmann machine) training techniques described herein.

The input device(s) 3150 can be a touch input device such as a keyboard, touchscreen, mouse, pen, trackball, a voice input device, a scanning device, or another device that provides input to the computing environment 3100. The output device(s) 3160 can be a display device (e.g., a computer monitor, laptop display, smartphone display, tablet display, netbook display, or touchscreen), printer, speaker, or another device that provides output from the computing environment 3100.

The communication connection(s) 3170 enable communication over a communication medium to are computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods or compilation/synthesis techniques for generating the disclosed circuits can be described in the general context of computer-readable instructions stored on one or more computer-readable media. Computer-readable media are any available media (e.g., memory or storage device) that can be accessed within or by a computing environment. Computer-readable media include tangible computer readable memory or storage devices, such as memory 3120 and/or storage 3140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 32:
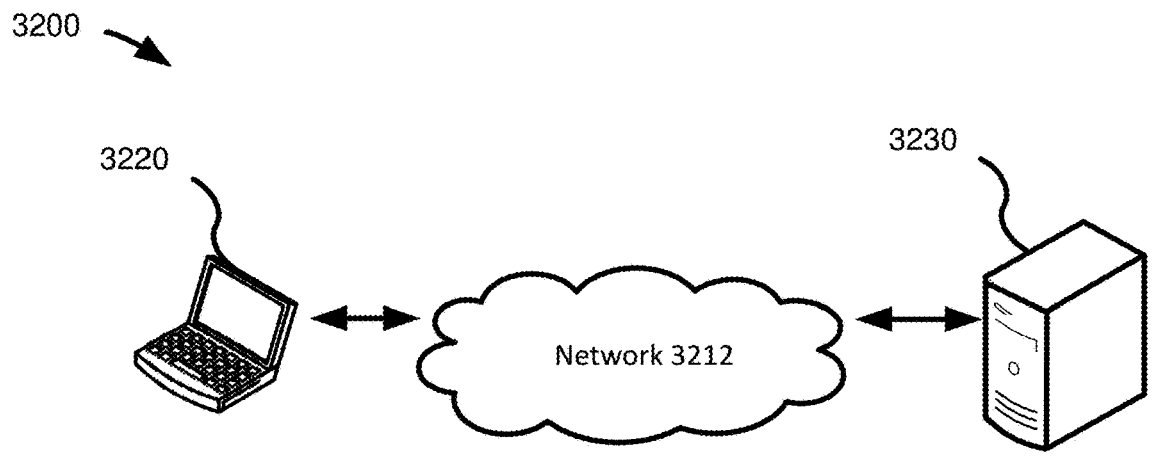
FIG. 32 illustrates an example of a possible network topology (e.g., a client-server network) for implementing a system according to the disclosed technology.

An example of a possible network topology 3200 (e.g., a client-server network) for implementing a system according to the disclosed technology is depicted in FIG. 32. Networked computing device 3220 can be, for example, a computer running a browser or other software connected to a network 3212. The computing device 3220 can have a computer architecture as shown in FIG. 31 and discussed above. The computing; device 3220 is not limited to a traditional personal computer but can comprise other computing hardware configured to connect to and communicate with a network 3212 (e.g., smart phones, laptop computers, tablet computers, or other mobile computing devices, servers, network devices, dedicated devices, and the like). In the illustrated embodiment, the computing device 3220 is configured to communicate with a computing device 3230 (e.g., a remote server, such as a server in a cloud computing environment) via a network 3212. In the illustrated embodiment, the computing device 3220 is configured to transmit input data to the computing device 3230, and the computing device 3230 is configured to implement any of the quantum Boltzmann machine training processes disclosed herein and outputting results to the computing device 3220. Any of the data received from the comparing device 3230 can be stored or displayed on the computing device 3220 (e.g., displayed as data, on a graphical user interface or web page at the computing devices 3220). In the illustrated embodiment, the illustrated net 3212 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 3212 can be the Internet or a similar public network and operate using an appropriate protocol (e.g., the HTTP protocol).

Figure 33:
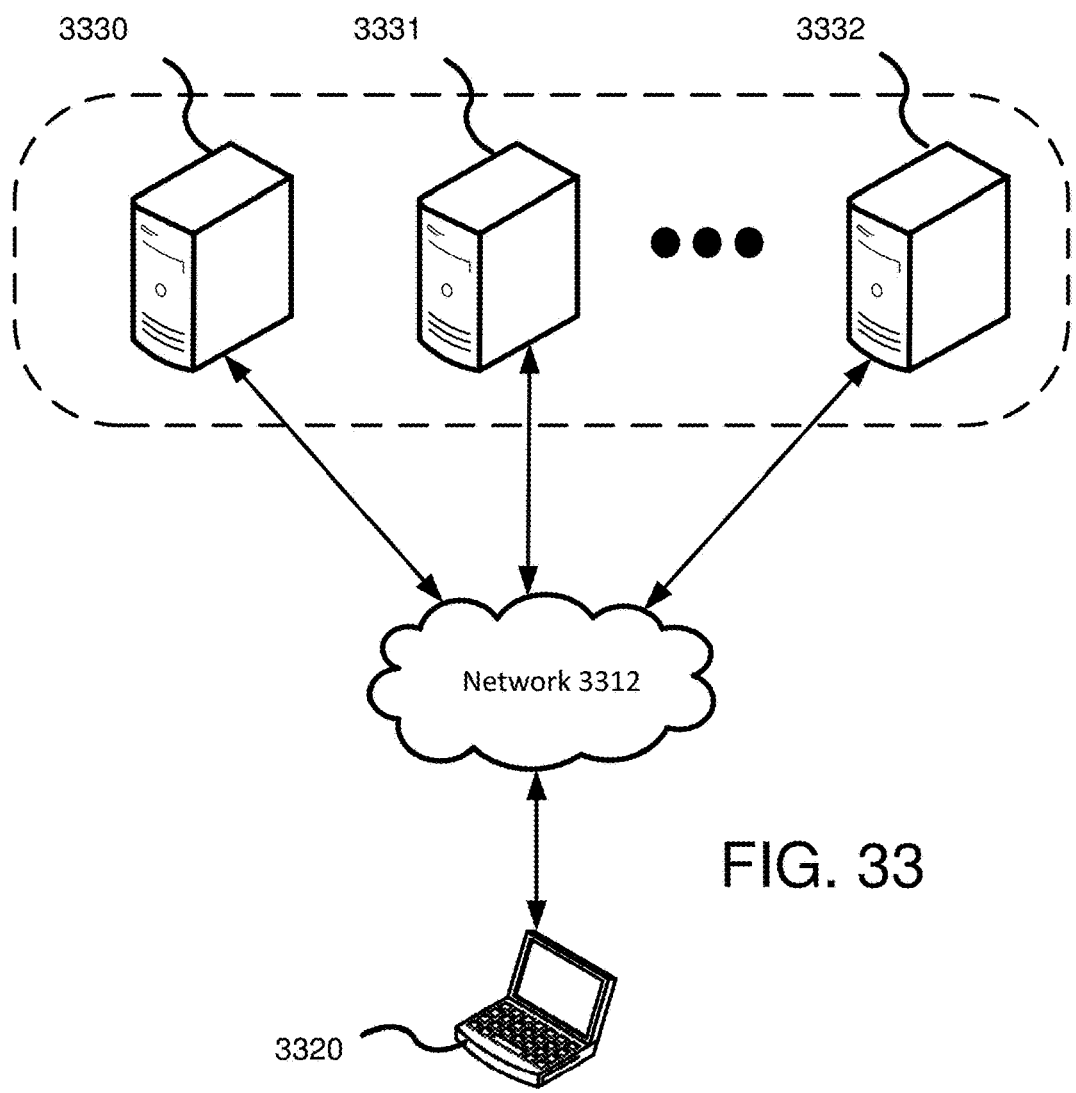
FIG. 33 illustrates an example of a possible network topology (e.g., a distributed computing environment) for implementing a system according to the disclosed technology.

Another example of a possible network topology 3300 (e.g., a distributed computing environment) for implementing a system according to the disclosed technology is depicted in FIG. 33. Networked computing device 3320 can be, for example, a computer running a browser or other software connected to a network 3312. The computing device 3320 can have a computer architecture as shown in FIG. 31 and discussed above. In the illustrated embodiment, the computing device 3320 is configured to communicate with multiple computing devices 3330, 3331, 3332 (e.g., remote servers or other distributed computing devices, such as one or more servers in a cloud computing environment) via the network 3312. In the illustrated embodiment, each of the computing devices 3330, 3331, 3332 in the computing environment 3300 is used to perform at least a portion of any of the quantum Boltzmann machine training processes disclosed herein. In other words, the computing devices 3330, 3331, 3332 form a distributed computing environment in which the quantum Boltzmann training process is shared across multiple computing devices. The computing device 3320 is configured to transmit input data to the computing devices 3330, 3331, 3332, which are configured to distributively implement any of the quantum Boltzmann machine training processes disclosed herein and to provide results to the computing device 3320. Any of the data, received from the computing devices 3330, 3331, 3332 can be stored or displayed on the computing device 3320 (e.g., displayed as data on a graphical user interface or web page at the computing devices 3320). The illustrated network 3312 can be any of the networks discussed above with respect to FIG. 32.

Figure 34:
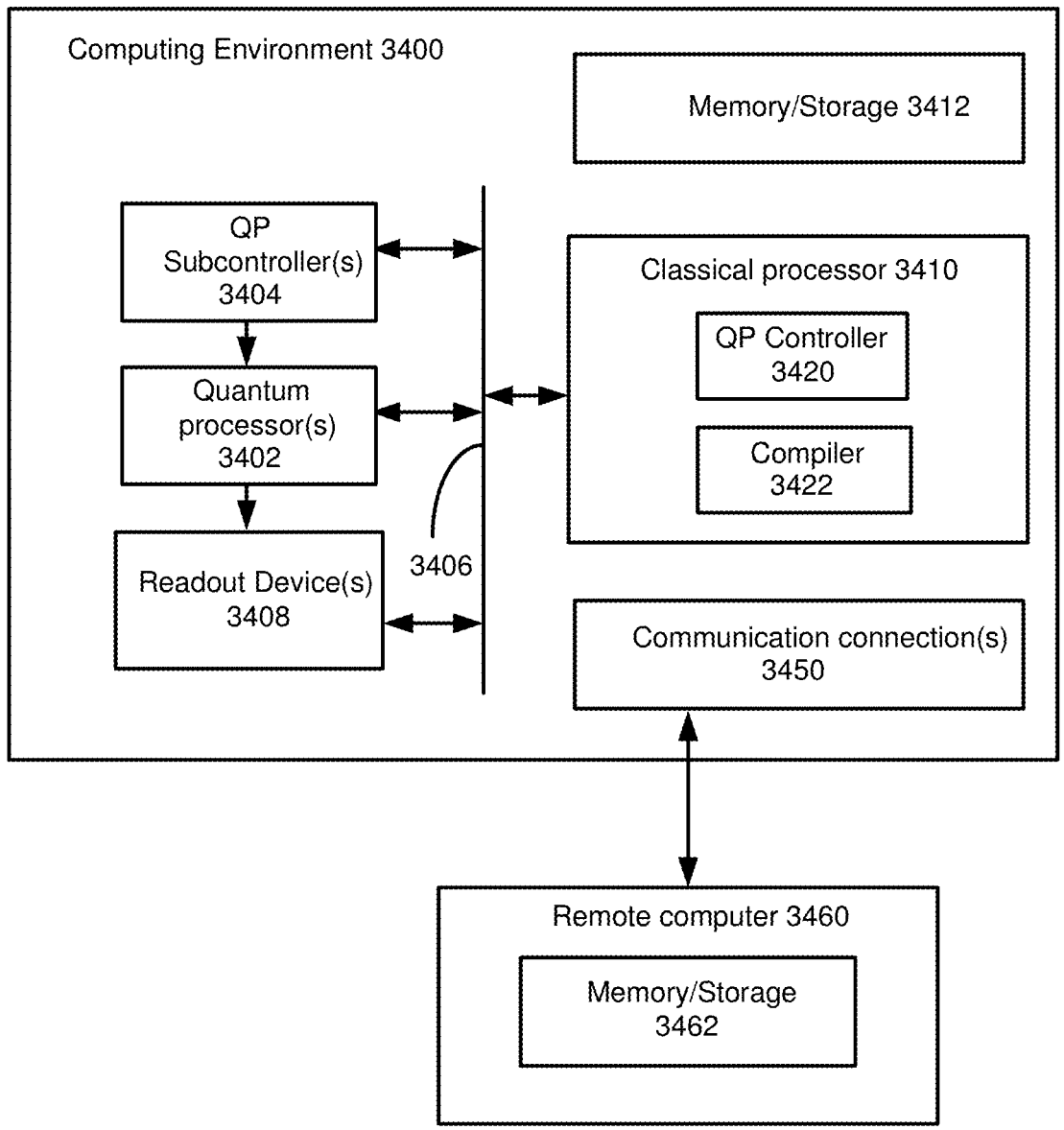
FIG. 34 illustrates an exemplary quantum computing system for implementing the disclosed technology.

With reference to FIG. 34, an exemplary system for implementing the disclosed technology includes computing environment 3400. In computing environment 3400, a compiled quantum computer circuit description, including a circuit description for one or more Boltzmann machines as disclosed herein, can be used to program (or configure) one or more quantum processing units such that the quantum processing unit(s) implement the circuit described by the quantum computer circuit description. The quantum computer circuit description can implement any of the Boltzmann machines discussed herein.

The environment 3400 includes one or more quantum processing units 3402 and one or more readout device(s) 3408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing: and/or (d) a topological quantum architecture (e.g., a topological quantum computing device using Majorana zero modes). The precompiled quantum circuits, including any of the disclosed circuits comprising quantum Boltzmann machines, can be sent into (or otherwise applied to) the quantum processing unit(s) via control lines 3106 at the control of quantum processor controller 3420. The quantum processor controller (QP controller) 3420 can operate in conjunction with a classical processor 3410 (e.g., having an architecture as described above with respect to FIG. 31) to implement the desired quantum computing process. Further, the classical processor 3410 can be programmed to implement any of the disclosed Boltzmann machine training methods.

In the illustrated example, the QP controller 3420 further implements the desired quantum computing process via one or more QP subcontrollers 3404 that are specially adapted to control a corresponding one of the quantum processor(s) 3402. For instance, in one example, the quantum controller 3420 facilitates implementation of the compiled quantum circuit by sending instructions to one or more memories (e.g., lower-temperature memories), which then pass the instructions to low-temperature control unit(s) (e.g., QP subcontroller(s) 3404) that transmit, for instance, pulse sequences representing the gates to the quantum processing unit(s) 3402 for implementation. In other examples, the QP controller(s) 3420 and QP subcontroller(s) 3404 operate to provide appropriate magnetic fields, encoded operations, or other such control signals to the quantum processor(s) to implement the operations of the compiled quantum computer circuit description. The quantum controller(s) can further interact with readout devices 3408 to help control and implement the desired quantum computing process (e.g., by reading or measuring out data results from the quantum processing units once available, etc.).

With reference to FIG. 34, compilation is the process of translating a high-level description of a quantum algorithm into a quantum computer circuit description comprising a sequence of quantum operations or gates, which can include the Boltzmann machine(s) as disclosed herein. The compilation can be performed by a compiler 3422 using a classical processor 3410 (e.g., as shown in FIG. 31) of the environment 3400 which loads the high-level description from memory or storage devices 3412 and stores the resulting quantum computer circuit description in the memory or storage devices 3412.

In other embodiments, compilation and/or Boltzmann machine training can be performed remotely by a remote computer 3400 (e.g., a computer having a computing environment as described above with respect to FIG. 31) which stores the resulting quantum computer circuit description and/or stores software for Boltzmann machine training in one or more memory or storage devices 3462 and transmits the quantum computer circuit description and/or training instructions to the computing environment 3400 for implementation in the quantum processing unit(s) 3402. Still further, the remote computer 3400 can store the high-level description and/or Boltzmann-machine-training instructions in the memory or storage devices 3462 and transmit the high-level description and/or instructions to the computing environment 3400 for compilation and use with the quantum process(s). In any of these scenarios, results from the computation performed by the quantum processor(s) can be communicated to the remote computer after and/or during the computation process. Sill further, the remote computer can communicate with the QP controller(s) 3420 such that the quantum computing process (including any compilation, Boltzmann machine training, and/or QP processor control procedures) can be remotely controlled by the remote computer 3460. In general, the remote computer 3460 communicates with the QP controller(s) 3420 and/or compiler/synthesizer 3422 via communication connections 3450.

In particular embodiments, the environment 3400 can be a cloud computing environment, which provides the quantum processing resources of the environment 3400 to one or more remote computers (such as remote computer 3460) over a suitable network (which can include the internet).

X. CONCLUDING REMARKS

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method, comprising:
    configuring a quantum computer to implement a Boltzmann machine in accordance with a first set of Hamiltonian terms;
    computing gradient values for adjusting the first set of Hamiltonian terms using a positive-operator-value-measure-based approach;
    computing a second set of Hamiltonian terms based at least in part on the computed gradient values; and
    configuring the quantum computer to implement the Boltzmann machine in accordance with the second set of Hamiltonian terms, wherein:
        the second set of Hamiltonian terms causes the Boltzmann machine to implement a second Hamiltonian that more likely reproduces a training set of data than a first Hamiltonian resulting from the first set of Hamiltonian terms,
        the gradient values are computed at least in part from a first thermal expectation of the respective Hamiltonian term and a second thermal expectation of the respective Hamiltonian term constrained to a training set,
        the first thermal expectation of the respective Hamiltonian term is computed by preparing a thermal state for a Hamiltonian model represented by the first Hamiltonian terms and measuring an expectation value for the respective Hamiltonian term from the prepared thermal state, and
        the second thermal expectation of the respective Hamiltonian term is computed by preparing a thermal state for a modified Hamiltonian model represented by the first Hamiltonian terms with an added positive-operator-value-measure constraint and measuring an expectation value for the respective Hamiltonian term from the prepared thermal state.

2. The method of claim 1, wherein the computing the second set of Hamiltonian terms comprises multiplying the gradient values by a selected learning rate.

3. The method of claim 1, wherein the computing the gradient values, for a respective Hamiltonian term, comprises:
    computing a first thermal expectation of the respective Hamiltonian term;
    computing a second thermal expectation of the respective Hamiltonian term constrained to a training example;
    computing a difference between the first thermal expectation and the second thermal expectation; and
    computing the gradient value for the respective Hamiltonian by multiplying the difference by a uniform probability distribution.

4. The method of claim 1, wherein the Hamiltonians implemented by the first Hamiltonian terms and the second Hamiltonian are non-stochastic Hamiltonians.

5. The method of claim 1, wherein the method is performed using measurement records that result from using measurement operators that do not solely project onto the computational basis.

6. The method of claim 1, wherein the method is performed using at least one positive-operator-value measure (POVM) constraint that does not solely project onto the computational basis.

7. A system, comprising:
    a quantum computing device; and
    a classical computer configured to communicate with and control the quantum computer, the classical computer comprising memory and a processor, the classical computer being programmed to perform a method, comprising:
        configuring the quantum computing device to implement a Boltzmann machine in accordance with a first set of Hamiltonian terms;
        computing gradient values for adjusting the first set of Hamiltonian terms using a positive-operator-value-measure-based approach;
        computing a second set of Hamiltonian terms based at least in part on the computed gradient values; and
        configuring the quantum computing device to implement the Boltzmann machine in accordance with the second set of Hamiltonian terms, wherein:
            the second set of Hamiltonian terms causes the Boltzmann machine to implement a second Hamiltonian that more likely reproduces a training set of data than a first Hamiltonian resulting from the first set of Hamiltonian terms,
            the gradient values are computed at least in part from a first thermal expectation of the respective Hamiltonian term and a second thermal expectation of the respective Hamiltonian term constrained to a training set,
            the first thermal expectation of the respective Hamiltonian term is computed by preparing a thermal state for a Hamiltonian model represented by the first Hamiltonian terms and measuring an expectation value for the respective Hamiltonian term from the prepared thermal state, and the second thermal expectation of the respective Hamiltonian term is computed by preparing a thermal state for a modified Hamiltonian model represented by the first Hamiltonian terms with an added positive-operator-value-measure constraint and measuring an expectation value for the respective Hamiltonian term from the prepared thermal state.

8. A method, comprising:
configuring a quantum computer to implement a Boltzmann machine in accordance with a first set of Hamiltonian terms;
computing gradient values for adjusting the first set of Hamiltonian terms using a relative entropy approach;
computing a second set of Hamiltonian terms based at least in part on the computed gradient values; and
configuring the quantum computer to implement the Boltzmann machine in accordance with the second set of Hamiltonian terms, wherein the second set of Hamiltonian terms cause the Boltzmann machine to implement a second Hamiltonian that is more likely to reproduce a training set of data than a first Hamiltonian resulting from the first set of Hamiltonian terms, wherein the computing the gradient values comprises, for a respective Hamiltonian term, comprises:
preparing a quantum data distribution;
computing an expectation of the respective Hamiltonian term from the quantum data distribution;
computing a thermal expectation of the respective Hamiltonian term;
computing a difference between the expectation and the thermal expectation; and
computing the gradient value for the respective Hamiltonian by multiplying the difference by a probability distribution,
wherein the quantum data distribution corresponds to a target quantum state selected by a user.

9. A method, comprising:
configuring a quantum computer to implement a Boltzmann machine in accordance with a first set of Hamiltonian terms;
computing gradient values for adjusting the first set of Hamiltonian terms using a relative entropy approach;
computing a second set of Hamiltonian terms based at least in part on the computed gradient values; and
configuring the quantum computer to implement the Boltzmann machine in accordance with the second set of Hamiltonian terms, wherein the second set of Hamiltonian terms cause the Boltzmann machine to implement a second Hamiltonian that more likely reproduces a training set of data than a first Hamiltonian resulting from the first set of Hamiltonian terms, wherein the gradient values are computed at least in part from a data-distribution expectation of the respective Hamiltonian term and a thermal expectation of the respective Hamiltonian term,
wherein the data-distribution expectation is computed by taking a thermal average against a state that is not a mixed state in the computational basis, and
wherein the thermal expectation is computed by a Szeggedy walk designed to prepare an approximation to the thermal distribution, or a method based on quantum rejection sampling or linear-combinations of unitaries to refine an initial approximation to the thermal state into the exact thermal state or a close approximation thereof.

10. The method of claim 9, wherein the data-distribution expectation of the respective Hamiltonian term is computed by preparing a quantum data distribution, and measuring an expectation value for the respective Hamiltonian term from the quantum data distribution, and
wherein the thermal expectation of the respective Hamiltonian term is computed by preparing a thermal state for a Hamiltonian model represented by the first Hamiltonian terms, and measuring an expectation value for the respective Hamiltonian term from the prepared thermal state.

11. A system, comprising:
a quantum computing device; and
a classical computer configured to communicate with and control the quantum computer, the classical computer comprising memory and a processor, the classical computer being programmed to perform a method comprising:
configuring the quantum computing device to implement a Boltzmann machine in accordance with a first set of Hamiltonian terms;
computing gradient values for adjusting the first set of Hamiltonian terms using a relative entropy approach;
computing a second set of Hamiltonian terms based at least in part on the computed gradient values; and
configuring the quantum computing device to implement the Boltzmann machine in accordance with the second set of Hamiltonian terms, wherein the second set of Hamiltonian terms cause the Boltzmann machine to implement a second Hamiltonian that more likely reproduces a training set of data than a first Hamiltonian resulting from the first set of Hamiltonian terms, wherein the gradient values are computed at least in part from a data-distribution expectation of the respective Hamiltonian term and a thermal expectation of the respective Hamiltonian term,
wherein the data-distribution expectation is computed by taking a thermal average against a state that is not a mixed state in the computational basis, and
wherein the thermal expectation is computed by a Szeggedy walk designed to prepare an approximation to the thermal distribution, or a method based on quantum rejection sampling or linear-combinations of unitaries to refine an initial approximation to the thermal state into the exact thermal state or a close approximation thereof.

12. A method, comprising:
configuring a quantum computer to implement a Boltzmann machine in accordance with a first set of Hamiltonian terms;
computing gradient values for adjusting the first set of Hamiltonian terms using a commutator series approximation to the gradient of a training objective function;
computing a second set of Hamiltonian terms based at least in part on the computed gradient values; and
configuring the quantum computer to implement the Boltzmann machine in accordance with the second set of Hamiltonian terms, wherein the computing the gradient values comprises:
computing commutator expansions of the commutator series approximation;
for a respective term in a respective one of the commutator expansions:
preparing a thermal state for a Hamiltonian model represented by the first Hamiltonian terms; and
measuring an expectation value for the respective Hamiltonian term from the prepared thermal state.

13. A system, comprising:

a quantum computing device; and a classical computer configured to communicate with and control the quantum computer, the classical computer comprising memory and a processor, the classical computer being programmed to perform a method comprising:

configuring the quantum computing device to implement a Boltzmann machine in accordance with a first set of Hamiltonian terms;

computing gradient values for adjusting the first set of Hamiltonian terms using a commutator series approximation to the gradient of a training objective function;

computing a second set of Hamiltonian terms based at least in part on the computed gradient values; and configuring the quantum computing device to implement the Boltzmann machine in accordance with the second set of Hamiltonian terms, wherein the computing the gradient values comprises:

computing commutator expansions of the commutator series approximation;

for a respective term in a respective one of the commutator expansions:

preparing a thermal state for a Hamiltonian model represented by the first Hamiltonian terms; and measuring an expectation value for the respective Hamiltonian term from the prepared thermal state.

* * * * *